US012794990B2

(12) United States Patent
Gant

(10) Patent No.: US 12,794,990 B2
(45) Date of Patent: *Nov. 10, 2026

(54) FIREARM AUTHENTICATION AND TRACKING SYSTEM

(71) Applicant: AUTHGRIP INC., Marysville, WA (US)

(72) Inventor: Justin Gant, Lynnwood, WA (US)

(73) Assignee: AUTHGRIP INC., Marysville, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,381

(22) Filed: Oct. 16, 2023

(65) Prior Publication Data

US 2024/0364792 A1 Oct. 31, 2024

Related U.S. Application Data

(63) Continuation of application No. 17/524,258, filed on Nov. 11, 2021, now Pat. No. 11,792,283, which is a (Continued)

(51) Int. Cl.

*H04Q 1/00* (2006.01)
*F41A 17/06* (2006.01)

(Continued)

(52) U.S. Cl.

CPC .......... *H04L 67/535* (2022.05); *F41A 17/063* (2013.01); *G07C 9/32* (2020.01); *H04L 67/12* (2013.01); *H04L 67/306* (2013.01)

(58) Field of Classification Search

CPC ..... H04L 67/535; H04L 67/12; H04L 67/306; H04L 63/0272; H04L 63/102;

(Continued)

(56) References Cited

U.S. PATENT DOCUMENTS 5,502,915 A 4/1996 Mendelsohn
5,636,464 A 6/1997 Ciluffo (Continued)

FOREIGN PATENT DOCUMENTS

DE 102009057866 A1 6/2011

OTHER PUBLICATIONS

International Search Report mailed Jan. 24, 2017, issued in corresponding International Application No. PCT/US2016/056287, filed Oct. 10, 2016, 3 pages.

*Primary Examiner* — Tai T Nguyen

(57) ABSTRACT

A system and method for managing one or more firearms having an authentication device is described. The method may receive a profile of one or more firearm users. The profile of the one or more firearm users may be registered to access one or more authentication devices coupled to one or more firearms. A usage of the one or more firearms coupled to the authentication devices may be tracked via the profile of the firearm user. The system can include a central server, a secure management station with a secure application, a docking station, a respective firearm lock or authentication device for each firearm and an enrollment station, each communicating in a secure manner, to globally manage a plurality of firearms.

18 Claims, 17 Drawing Sheets

Related U.S. Application Data continuation of application No. 17/125,464, filed on Dec. 17, 2020, now Pat. No. 11,178,241.

(60) Provisional application No. 62/949,373, filed on Dec. 17, 2019.

(51) Int. Cl.

| | |
|---|---|
| ***G07C 9/32*** | (2020.01) |
| ***H04L 67/12*** | (2022.01) |
| ***H04L 67/306*** | (2022.01) |
| ***H04L 67/50*** | (2022.01) |

(58) Field of Classification Search

CPC .... H04L 63/0861; F41A 17/063; F41A 17/46; G07C 9/32; G07C 9/00896; G07C 9/37

USPC ........................................................ 340/5.52

See application file for complete search history.

(56) References Cited

U.S. PATENT DOCUMENTS

| | | | | |
|---|---|---|---|---|
| 5,915,936 | A | 6/1999 | Brentzel | |
| 5,937,557 | A | 8/1999 | Bowker | |
| 6,301,815 | B1 * | 10/2001 | Sliwa | F41A 17/066 42/70.11 |
| 7,356,959 | B2 | 4/2008 | Schmitter | |
| 8,726,556 | B1 * | 5/2014 | Willingham | F41A 17/063 42/70.11 |
| 8,827,706 | B2 | 9/2014 | Hogan, Jr. | |
| 8,947,252 | B2 | 2/2015 | Wilson | |
| 9,250,030 | B2 | 2/2016 | Henry | |
| 9,651,325 | B1 | 5/2017 | Gant et al. | |
| 9,857,133 | B1 | 1/2018 | Kloepfer | |
| 10,197,350 | B2 | 2/2019 | Kauffman | |
| 10,859,334 | B2 | 12/2020 | Gant et al. | |
| 11,561,058 | B2 * | 1/2023 | Canty | H04N 23/66 |
| 2002/0112390 | A1 | 8/2002 | Harling et al. | |
| 2002/0158095 | A1 | 10/2002 | Vor Keller | |
| 2002/0170220 | A1 | 11/2002 | Recce | |
| 2004/0031180 | A1 | 2/2004 | Ivanov | |
| 2007/0074438 | A1 | 4/2007 | Parhofer | |
| 2007/0180749 | A1 * | 8/2007 | Schumacher | F41A 17/063 42/70.01 |
| 2007/0186457 | A1 | 8/2007 | Pitt | |
| 2007/0271831 | A1 | 11/2007 | Newkirk et al. | |
| 2008/0039962 | A1 * | 2/2008 | McRae | G01S 17/88 356/3 |
| 2008/0282595 | A1 | 11/2008 | Clark et al. | |
| 2011/0025491 | A1 * | 2/2011 | Cazanas | F41A 19/01 340/539.1 |
| 2011/0309975 | A1 | 12/2011 | Chu | |
| 2013/0019510 | A1 | 1/2013 | Kemmerer et al. | |
| 2014/0360073 | A1 | 12/2014 | Stewart | |
| 2014/0366419 | A1 | 12/2014 | Allan | |
| 2014/0366421 | A1 | 12/2014 | Arif et al. | |
| 2015/0040453 | A1 * | 2/2015 | Ballard | F41A 17/063 42/70.11 |
| 2016/0084601 | A1 | 3/2016 | Alicea, Jr. | |
| 2016/0086472 | A1 * | 3/2016 | Herrera | F41C 33/029 340/539.11 |
| 2017/0160041 | A1 * | 6/2017 | Stewart | F41C 23/22 |
| 2017/0248388 | A1 * | 8/2017 | Young | F41A 17/063 |
| 2017/0286654 | A1 * | 10/2017 | Nicoll | F41A 17/08 |
| 2017/0299301 | A1 | 10/2017 | Gant et al. | |
| 2018/0023910 | A1 * | 1/2018 | Kramer | H04N 5/772 386/227 |
| 2018/0031345 | A1 | 2/2018 | Winiecki | |
| 2018/0142977 | A1 | 5/2018 | Kloepfer et al. | |
| 2019/0310042 | A1 * | 10/2019 | Himmich | F41A 17/46 |
| 2021/0080207 | A1 * | 3/2021 | Deng | G01S 5/0009 |

* cited by examiner

FIREARM AUTHENTICATION AND TRACKING SYSTEM

PRIORITY CLAIM

The present application is a continuation of U.S. patent application Ser. No. 17/524,258, filed Nov. 11, 2021, now U.S. Pat. No. 11,792,283, issued Oct. 17, 2023, which is a continuation of U.S. patent application Ser. No. 17/125,464, filed Dec. 17, 2020, now U.S. Pat. No. 11,178,241, issued Nov. 16, 2021, which claims priority to U.S. Provisional Application No. 62/949,373, filed on Dec. 17, 2019, the contents of which are incorporated herein by reference.

BACKGROUND

Controlling unauthorized use of a firearm is a focus of various manufacturers. Trigger locks and other safety devices, which can be manual or automatic systems, often consist of a mixture of electronic and mechanical components. In these systems, a trigger lock is mounted to the firearm and removes the primary trigger function, rendering it disabled. Design considerations dictate whether the trigger is physically blocked from movement, or merely removed from the actuation circuit. User authentication provides an extra level of safety to the system.

Conventional trigger locking systems and "smart" firearms are typically purchased and installed by the manufacturer for the most seamless integration. Available aftermarket systems can be cumbersome, unreliable, and difficult to install.

SUMMARY

As noted above, existing systems that provide conventional trigger locking or user authentication for using a firearm can be cumbersome and unreliable. A need exists for a trigger locking system that can be universally installed on a variety of firearms, integrated into the firearm without detracting from the form or function of the firearm, and that includes a reliable mechanism to lock the device and enable the trigger upon authentication.

One general aspect that is disclosed herein to address the above issues includes a method for managing one or more firearms having an authentication device. The authentication device can be integrated into the firearm to enable the use of the trigger upon authentication of the user, through biometric or other means. The method also includes receiving a profile of one or more firearm users. The method also includes registering the profile of the one or more firearm users to access one or more authentication devices coupled to one or more firearms. The method also includes tracking the usage by a user of the one or more firearms coupled to the authentication devices via the profile of the firearm user. Other embodiments of this aspect include corresponding computer systems, apparatus, and computer programs recorded on one or more computer storage devices, each configured to perform the actions of the methods.

Implementations may include one or more of the following features. The method may include determining credentials of each profile of the one or more firearm users and allocating the credentials to predetermined firearms. In some instances, the method may group one or more user profiles into one or more squadrons. The method may also assign each of the one or more user profiles a ranking level within the one or more squadrons. The method may include assigning one or more firearms to the one or more squadrons. The method may include tracking at least one of a location, discharge, battery, and usage statistics of the one or more firearms. In some embodiments, the method may determine a geographical location of one of the one or more firearms. The method may include defining a predetermined usage boundary for the one or more firearms and disabling, automatically, one of the one or more firearms when the firearm violates the predetermined usage boundaries. In another aspect, an alert can be provided when the firearm leaves a predefined boundary or violates a defined boundary. The alerts can be provided through the system software, an application, a text, an email, a multimodal alert, a sound, a haptic response, and so forth. The predetermined usage boundary may be a geographical boundary, a time-based boundary, or some other type of boundary. The predetermined usage boundary may relate to user information or data and for example can define an unauthorized user of the one or more firearms. The predetermined usage boundary may relate to usage of a firearm and can include a predetermined number of discharges from a firearm. The predetermined usage boundary may include a predetermined type of ammunition.

In an embodiment, the method may generate an alert when the firearm is disabled. The method may include receiving usage data about one of the one or more firearms, analyzing the usage data and generating a report detailing the analyzed usage data. The method may include receiving a discharge notification when one of the one or more firearms discharges and generating a discharge alert when the discharge notification is received. The method may include receiving a docking notification when one of the one or more firearms is docked at a docking station and generating a docking alert when the docking notification is received.

In an embodiment, the method may include receiving a firearm profile of the one or more firearms and registering an authentication device to a firearm profile. The firearm profile may include at least one of a firearm serial number, firearm type, ammunition type, and discharge speed. The method may include limiting operation of the firearm to one or more firearm users. Implementations of the described techniques may include hardware, a method or process, or computer software on a computer-accessible medium.

One general aspect includes a method for enrolling a user of a firearm safety system at an enrollment station. The method also includes receiving instructions to enroll a new user of the firearm safety system and receiving one or more biometric data points from the new user. The method also includes finalizing a user profile with the one or more biometric data points, where the one or more biometric data points enable the new user to access at least one authentication device coupled to a firearm. Radio Frequency Identification (RFID) devices, biorhythm data, biometric data, or smart cards, embedded smart tags, smart rings, bio-rhythm sensing components, and so forth, can be used as part of these processes. Other embodiments of this aspect include corresponding computer systems, apparatus, and computer programs recorded on one or more computer storage devices, each configured to perform the actions of the methods.

Implementations may include one or more of the following features. The method may include communicating a finalized profile to a remote firearm management server. The method may include receiving one or more user credentials. The one or more user credentials may include one of a state license, federal license, firearm certification, firearm training, military training, and law enforcement training. The method may verify the one or more user credentials. The one or more biometric data points may include at least one of a fingerprint, voice identification, retina identification, facial recognition, finger geometry, and vein recognition. Biorhythm data, RFID, proximity, or smart card data with a two-factor authentication and handshakes between a card, bracelet, ring or other item on the body and a locking mechanism can be used. The method may include verifying the one or more biometric data points, such as a fingerprint or facial recognition data. Implementations of the described techniques may include hardware, a method or process, or computer software on a computer-accessible medium.

One general aspect includes a method of communicating with a firearm authentication device. The communication in this case can be performed by a docking station. The method of communicating also includes establishing communication with an authentication device coupled to a firearm, downloading firearm statistics from the authentication device and uploading a firearm profile to the authentication device coupled to the firearm. Using a docking station to perform this communication with the firearm can enable proper communication without connecting the firearm to the Internet generally. In one aspect, the authentication device will or may have the ability to send data via satellite/cellular but will be presented from receiving data other than data of a certain type, such as than GPS coordinates. The docking station can communicate in one aspect with the firearm authentication device and in another aspect can communicate with a management system in the cloud, thus isolating the authentication device of the firearm from the Internet. Other embodiments of this aspect include corresponding computer systems, apparatus, and computer programs recorded on one or more computer storage devices, each configured to perform the actions of the methods.

Implementations may include one or more of the following features. The method may include communicating a battery status of the authentication device to a central server or management system in the cloud. The method may include communicating a docking status to the central server. The method may include communicating a health status of the firearm to the central server. The firearm profile may include at least one of an authenticated user, geographical usage boundaries, other usage boundaries, discharge threshold, allowed ammunition, and reload threshold. The firearm statistics may include at least one of user access, firearm health, and authentication device battery, access attempts to the authentication device, biometric data of users, GPS locations, discharge status, and discharge quantity. Implementations of the described techniques may include hardware, a method or process, or computer software on a computer-accessible medium.

One general aspect of this disclosure includes a firearm authentication system. The firearm authentication system also includes an authentication device implemented on a firearm and configured to limit operation of a firearm to an approved user. The system also includes a docking station operably couplable to the authentication device and configured to download firearm statistics from the authentication device and upload a firearm profile to the authentication device safety coupled to the firearm. Other embodiments of this aspect include corresponding computer systems, apparatus, and computer programs recorded on one or more computer storage devices, each configured to perform the actions of the methods.

Implementations may include one or more of the following features. For instance, the docking station may be further configured to charge the authentication device. The docking station may communicate a battery status of the authentication device to a central server. The docking station may indicate an operable status of the authentication device. The docking station may communicate a health status of the firearm to a central server. The docking station may communicate any other status of the firearm to the central server. The docking station may communicate a docking status to the central server. The docking station can establish a secure communication with a firearm lock, authentication device or authentication device safety associated with the firearm and can establish a secure tunnel for encrypted communications to a network-based server (i.e., the central server, a remote server, a cloud-based server, etc.) where the database is managed. In one aspect, the docking station does not store any authentication data but repackages such data and transmits it to the network-based server. This structure allows for the secure control and transmission of data to and from each weapon without exposing the weapon to hacking. Implementations of the described techniques may include hardware, a method or process, or computer software on a computer-accessible medium.

One general aspect includes a firearm authentication and management system. The firearm authentication and management system can include an enrollment station configured to enroll or register users who desire to use firearms. The enrollment station communicates in a secure manner with a management station that includes a secure application used to manage firearm usage and access and to obtain various datapoints. A firearm manager can log into the management station to manage the firearm usage and associated data. A secure tunnel with encrypted traffic can be established between the management station and a network-based server where further management of the data can occur.

The firearm authentication system can also include an authentication device configured to limit operation of a firearm to one or more one users. The authentication device also can include a docking module configured to communicate a status of the authentication device to a docking station. The authentication device can store authentication data right on the firearm and enable user authentication while the firearm is in a locked status, and upon authentication, the firearm can transition to an unlocked status in which the trigger is accessible and/or can be pulled to fire the firearm. Other embodiments of this aspect include corresponding computer systems, apparatus, and computer programs recorded on one or more computer storage devices, each configured to perform the actions of the methods.

DESCRIPTION OF THE DRAWINGS

A further understanding of the nature and advantages of the various embodiments described herein may be realized by reference to the following drawings accompanied by the detailed description. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
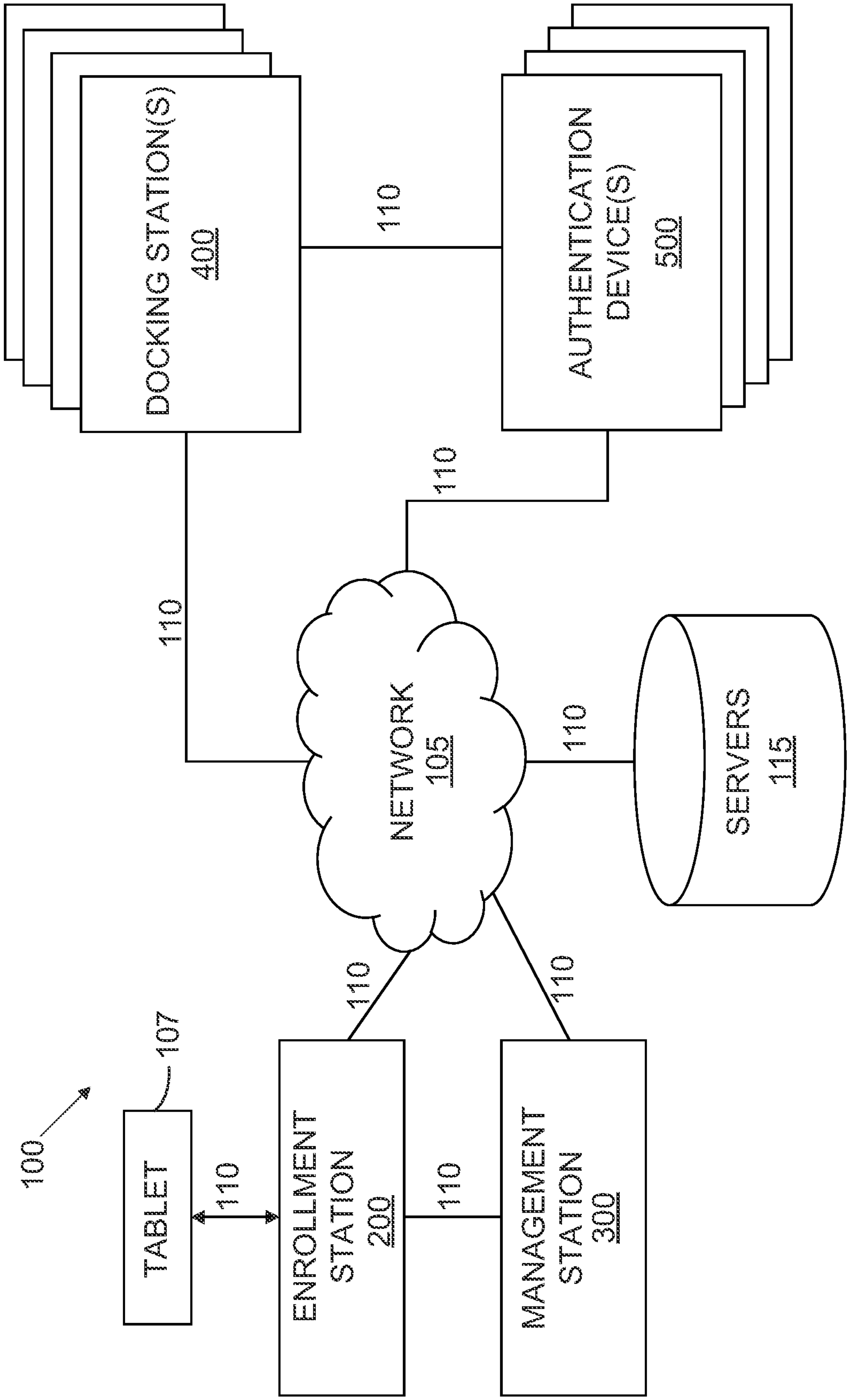
FIG. 1 is a block diagram of an environment in which the present systems and methods may be implemented, in accordance with various aspects of this disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein are interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order to not unnecessarily obscure various aspects of the present disclosure. Further, it will be appreciated that embodiments of the present disclosure may employ any combination of features described herein.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value.

FIG. 1 illustrates an example of a firearm authentication and tracking system 100 in accordance with various aspects of this disclosure. The firearm authentication and tracking system 100 may include an enrollment station 200, management station 300, one or more docking station(s) 400, and one or more authentication device(s) 500 which communicate over at least one network 105. A user device such as a tablet or other computing device 107 can be issued to a user for use in communicating with the enrollment station 200. The authentication device(s) 500 are installed on respective firearms and can include mechanical and/or electrical locking or safety mechanisms that can prevent a user from firing the firearm unless authenticated (shown and described with respect to FIGS. 5C-5K). For example, an authentication device 500 can be integrated into the handle and body of a firearm and include a biometric reader, a printed circuit board, and a trigger locking mechanism. Other aspects include integrating the authentication device 500 into a stock component, an accessory rail, or other location on the firearm. The reader can also include an RF reader, and a component can be provided for a back-up mechanical key. The authentication device 500 can receive and store user profile data (authorized user data, biometric data, etc.), authenticate a user in a locked status of the trigger, and upon authentication, release a locking bar to allow the trigger move for use by the authorized user. When the user sets down or releases their grip of the firearm, the firearm can automatically transition back to a locked status in preparation for authentication the next user that picked up the firearm.

The network 105 may provide user authentication, encryption, access authorization, tracking, Internet Protocol (IP) connectivity, and other access, calculation, modification, and/or functions. The various devices may interface with the network 105 through wired and/or wireless communications links 110 to one or more remote servers 115. The remote server 115 can provide a network-based server that stores data, updates profiles, and communicates with the various components as shown in FIG. 1. In various examples, the management station 300 and the docking stations 400 may communicate, either directly or indirectly (e.g., with each other over wired and/or wireless communication links 110).

The management station 300 may communicate, wired and/or wirelessly, with one or more enrollment stations 200. A user can be provided with a specialized user device or tablet 107 configured just for them that can communicate with an enrollment station 200 to initially register the user with the system. The enrollment station 200 may enable the management station 300 to gather and compile various firearm user data into a user profile. The management station 300 may further communicate, wired and/or wirelessly, with the one or more docking stations 400. The management station 300 can push data to the server 115 and the docking stations 400 can sync with and download an encrypted database from the server 115 in response to a request from a qualified firearm. The docking stations 400 may be located in the home of a firearm user or at a central location such as a police station or other central location for various personnel. In some embodiments, docking stations 400 may be mobile such as located within a police vehicle, military vehicle, or the like. The docking station 400 may have a particular configuration that is tailored to its environment such as a home, vehicle, type of vehicle, and so forth.

The docking stations 400 may communicate directly with the one or more authentication devices 500. The authentication device 500 can include a processor, battery, a communication component, and other computer hardware that integrates with the structure of a respective firearm to be able to lock or disable the firearm according to its instruction and to communicate with at least one docking station 400 (as well as other components in communication with the network 105, such as the enrollment station 200, management station 300, and/or the servers 115). For example, the authentication device 500 may couple to the docking station 400 to charge a battery proximate the authentication device 500. The authentication device 500 may also communicate various data and statistics concerning the life of the firearm since the last time the authentication device 500 synced with the docking station 400. Note that the docking station will not store any such data but will repackage any received data for transmission to the remote server 115 or to the firearm authentication device 500 for further actions.

The communication links 110 shown in communications system 100 may include uplink (UL) transmissions from one station to another, or from one station to a device, and/or downlink (DL) transmissions, from one station to another, or from one station to a device. The downlink transmissions may also be called forward link transmissions while the uplink transmissions may also be called reverse link transmissions. Each communication link 110 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 115 may transmit bidirectional communications and/or unidirectional communications. Communication links 110 may include one or more connections, including but not limited to, 345 MHz, Wi-Fi, BLUETOOTH®, BLUETOOTH® Low Energy, cellular, Z-WAVE®, 802.11, peer-to-peer, LAN, WLAN, Ethernet, fire wire, fiber optic, and/or other connection types related to security and/or automation systems.

Each station 200, 300, 400 and devices 107, 500 may also communicate directly with each other via one or more direct communication links 110. Two or more stations or devices may communicate via a direct communication link 110 when both stations and/or devices are in a predetermined geographic coverage area or when one or neither devices is within the geographic coverage area. Examples of direct communication links 110 may include Wi-Fi Direct, BLUETOOTH®, wired, and/or, and other P2P group connections. The communication protocols may include WLAN radio and baseband protocol including physical and MAC layers from IEEE 802.11, and its various versions including, but not limited to, 802.11b, 802.11g, 802.11a, 802.11n, 802.11ac, 802.1 lad, 802.11ah, etc. In other implementations, other peer-to-peer connections and/or ad hoc networks may be implemented within the system 100.

The authentication devices 500 may be coupled to existing firearms either owned by an individual, a group of persons, law enforcement, military, company, or the like (collectively called "personnel" throughout the application for ease). The authentication device 500 may prevent an unauthorized user from discharging the firearm. The authentication device 500 may additionally track and control a firearm when coupled to the management station 300, or otherwise. For example, as will be described in further detail below, the enrollment station 200 may generate a profile for a firearm user. The management station 300 may then enable the personnel to manage firearm users and firearms fitted with an authentication device 500.

All of the elements in the firearm authentication and tracking system 100 may work independently of each other, and in further embodiments, may be personalized to the each end customer. For example, a law enforcement customer may require all of the components outlined, i.e. an enrollment station 200, a management station 300, a plurality of docking stations 400, and a plurality of authentication devices 500. Likewise, if the end user is a government agency or security personnel, all of the components may be utilized in the end application. In further embodiments, the end consumer may only need the docking station 400 and the authentication device 500. In some situations, the docking station 400 may provide alerts to a firearm owner through a personal device such as a mobile phone, laptop, smart assistant, or the like.

Figure 2B:
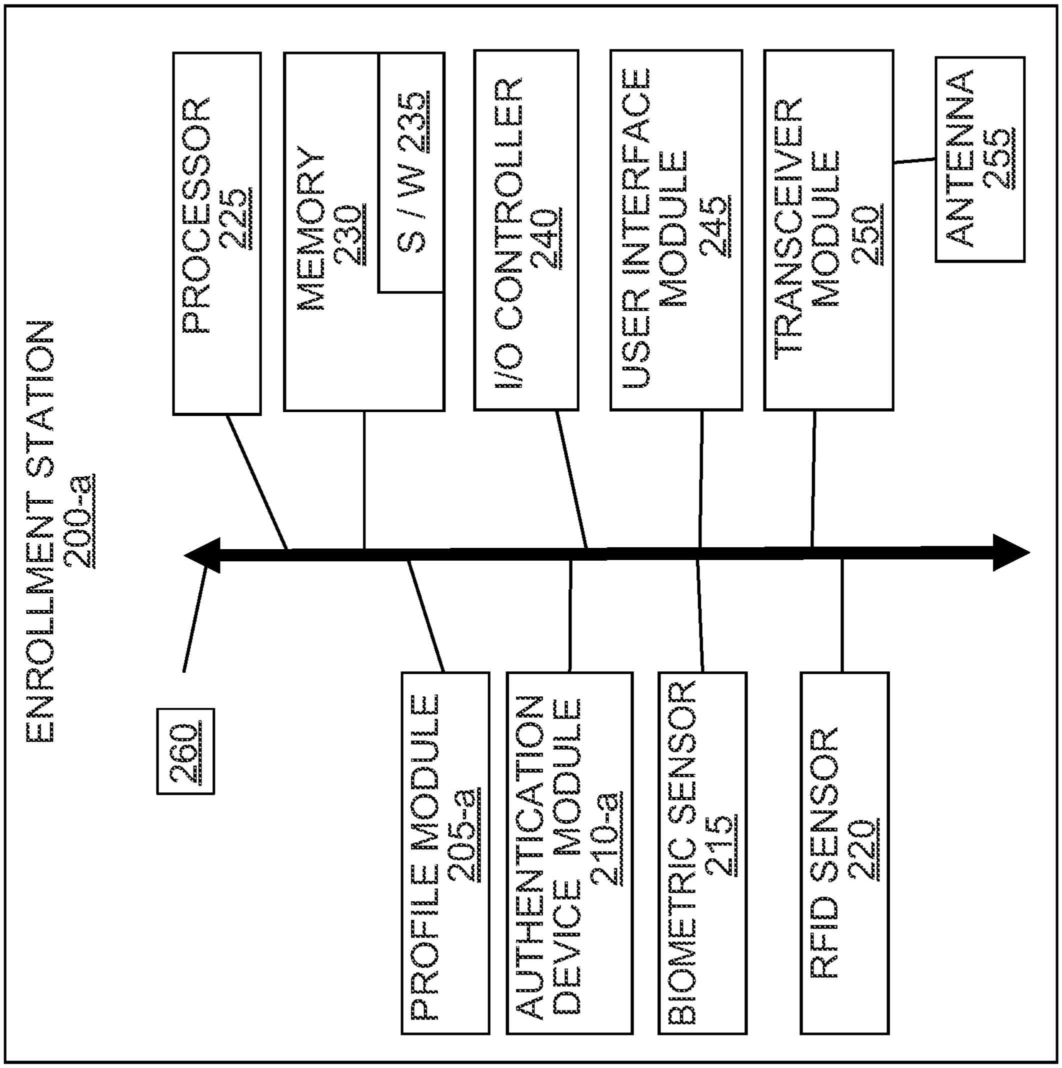
FIG. 2B is a block diagram of the example enrollment station of the environments shown in FIG. 2A, in accordance with various aspects of this disclosure.
Figure 2A:
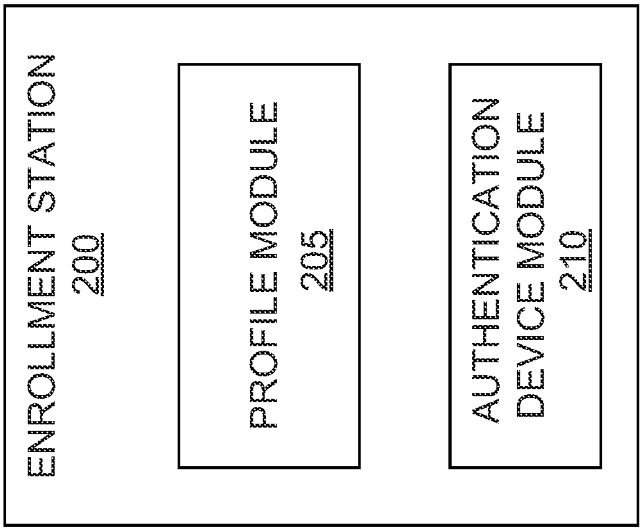
FIG. 2A is a block diagram of an example enrollment station of the environments shown in FIG. 1, in accordance with various aspects of this disclosure.

FIG. 2A is an exemplary block diagram of an enrollment station 200. The enrollment station 200 may be an example of the enrollment station 200 discussed with relation to FIG. 1. In some embodiments, the enrollment station 200 may include a profile module 205 and an authentication device module 210.

The profile module 205 may register one or more users of a firearm. For example, the profile module 205 may receive a request to generate a new user profile. The request may come from a user device 107 that is in communication with the enrollment station 200. The request may be a general request or may be a specific request. For example, the profiles may have predetermined parameters already put in place and the request may specify the type of user. The type of user may vary depending on the end usage. For example, a recreational user may significantly limit the usage of a personal firearm when registering other users. Similarly, a recreational user may have very few restrictions on his or her own profile or perhaps a profile of a spouse or other experienced user. In other embodiments, if the personnel are generating profiles for law enforcement, for example, the profiles may vary depending on the users rank and experience. A high ranking officer may have a set pre-generated profile with parameters.

In another example, a law enforcement application may be used to manage a 3-tiered database, where the most common user of the firearm is in a Database A, the precinct is in Database B, and the entire organization is in Database C. The database associated with this structure can be stored on the remote server 115 or elsewhere in the system. This tiered structure can be used to prioritize the databases and unlock a weapon as fast as possible for the most common users. At the same time, the system maintains support of the lower-tier profiles for unlocking, for instance, firearms used by tens of thousands of officers or military personnel.

In some embodiments, the profile module 205 may gather information to uniquely identify a potential firearm user. This may include various biometric data as well as personal data. Biometric data may include one or more fingerprints, voice identification, retina identification, voice identification, retina identification, facial recognition, finger geometry, vein recognition, and the like. This may also include radio frequency identification (RFID). For example, each user may be provided with a unique RFID tag or button or device. The enrollment station 200 may associated the unique RFID tag with the user's profile. The unique user device 107 may also be the user's mobile device, which can communicate via secure communications with the enrollment station 200 to identify the firearm user.

In some embodiments, the user profile may also include a user's name, address, telephone number, training certifications, badge number, precinct information, and the like. Personal data may also include more advanced information such as military or law enforcement training, state certifications, advanced classes, criminal record, or the like. In some embodiments, profiles may list federal, state, or international licenses or some combination thereof.

In some embodiments, the enrollment station 200 may also include an authentication device module 210. In other embodiments, the authentication device module 210 may additionally or alternatively be a part of the management station 300. The authentication device module 210 may generate a profile that links an activation or authentication device 500 with a specific firearm. For example, the authentication device 500 may have a unique identifier such as a serial number. The authentication device module 210 may link a specific authentication device 500 using the unique identifier to a specific firearm that the authentication device 500 is installed on. In some embodiments, the authentication device 500 and/or the firearm may generate a profile which may include various characteristics of the firearm such as type, serial number, caliber, class characteristics, types of ammunition, rifling pattern, discharge speed, reload speed, firearm modifications, and the like.

FIG. 2B shows a block diagram of an enrollment station 200-*a* for use in a firearm authentication and management system 100. The enrollment station 200-*a* may be an example of an enrollment station 200 discussed with reference to FIGS. 1 and/or 2A. The enrollment station 200-*a* may include a profile module 205-*a* and an authentication device module 210-*a*. In further embodiments, the enrollment station 200 may also include a biometric sensor 215 and/or an RFID sensor 220.

The enrollment station 200-*a* may further include a processor module 225, and memory 230, including software/firmware code (SW) 235. The enrollment station 200-*a* may also have an input/output controller (I/O) 240 and user interface module 245. In some embodiments, the enrollment station 200-*a* may also have a transceiver module 250 coupled to one or more antennas 255. All of the components of the enrollment station 200-*a* may communicate, directly or indirectly, with one another via one or more buses 260.

In some embodiments, the transceiver module 250 may communicate bi-directionally via the one or more antennas 255, wired links, and/or wireless links with one or more networks or other devices as described above, including a mobile device 107 of a user. For example, the transceiver module 250 may communicate bi-directionally with the user device 107, the management station 200, docking station 400, authentication device 500, remote server 1155, and/or remote storage. The transceiver module 250 may include a modem to modulate the packets and provide the modulated packets to the one or more antennas 255 for transmission, and to demodulate packets received from the one or more antenna 255. While a single antenna 255 is shown, the enrollment station 200-*a* may have multiple antennas 255 which may enable concurrently transmitting or receiving multiple transmissions. In some embodiments, one element of the enrollment station 200-*a* (e.g., the one or more antennas 255, transceiver module 250, etc.) may provide a direct connection to a remote server (e.g., remote server 115) via a direct network link to the Internet via a POP (point of presence). In an embodiment, one element of the enrollment station 200-*a* (e.g., the one or more antennas 255, the transceiver module 250, etc.) may provide a connection using wireless techniques, including digital cellular telephone connection, Cellular Digital Packet Data (CDPD) connection, digital satellite data connection, and/or another connection.

The signals associated with enrollment station 200-*a* may include wireless communication signals such as radio frequency, electromagnetics, local area network (LAN), wide area network (WAN), virtual private network (VPN), wireless network (using 802.11, for example), 245 MHz, Z-WAVE®, cellular network (using 2G, LTE and/or 5G, for example), and/or other signals. The one or more antennas 255 and/or transceiver module 250 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN)

applications (including RFID and UWB). In some embodiments, each antenna 255 may receive signals or information specific and/or exclusive to itself. In other embodiments, each antenna 255 may receive signals or information not specific or exclusive to itself. In other embodiments, the signals associated with the enrollment station 200-*a* may include various wired connections.

In some embodiments, the enrollment station 200-*a* may include one or more biometric sensors 215 and/or an RFID sensor 220. The one or more biometric sensors 215 may collect one or more pieces of biometric data of a firearm user. For example, the one or more biometric sensors may include a fingerprint scanner, a microphone for audio input, an iris or retina scanner, a camera or sensor for facial recognition, and the like. In some embodiments, the one or more biometric sensors 215 may read or measure light, temperature, speed, electrical capacity, and other types of energies to gather biometric data. The RFID sensor 220 may gather information from an RFID tag associated with the user. For example, an authorized user may wear a ring that has an RFID tag that is read or sensed by the RFID sensor 220. The one or more biometric sensors 215 and/or the RFID sensor 220 may connect to some element of the system (e.g., firearm authentication and tracking system 100) via a network using one or more wired and/or wireless connections.

The user interface module 245 may enable a person to interact with the enrollment station 200-*a*. For example, the user interface module 245 may include a visual display such as a display screen, an audio device such as a speaker, and various input devices such as a keyboard, touch-screen, microphone, or the like. Multimodal inputs and outputs may be provided as well. In some embodiments, the user interface module 245 may communicate with a remote or external device through the I/O controller 240.

The memory 230 may include random access memory (RAM), read only memory (ROM), flash RAM, other types of memory, or some combination thereof. The memory 230 may store computer-readable, computer-executable software/firmware code 235 which may include instructions that, when executed, cause the processor module 225 to perform various functions described in this disclosure (e.g., registering a new user, gathering biometric data, registering an RFID device, etc.). Alternatively, the software/firmware code 235 may not be directly executable by the processor module 235 but may cause a computer to perform functions described herein. Alternatively, the computer-readable, computer-executable software/firmware code 235 may not be directly executable by the processor module 225 but may be configured to cause a computer (e.g., when compiled and executed) to perform functions described herein. The processor module 225 may include an intelligent hardware device, e.g., a central processing unit (CPU), a microcontroller, an application-specific integrated circuit (ASIC), etc. A software module can include computer-readable programming code (in any language) which, when executed by a processor, causes the processor to perform certain operations, thus making a device operating with the processor as instructed by the module into a special purpose system or device.

In some embodiments, the memory 230 can contain, among other things, the Basic Input-Output system (BIOS) which may control basic hardware and/or software operation such as the interaction with peripheral components or devices. For example, the profile module 205-*a* and the authentication device module 210-*a* to implement the present systems and methods may be stored within the system memory 230. Applications may be resident within the enrollment station, e.g., a hard disk drive or other storage medium, alternatively or additionally, applications can be in the form of electronic signals modulated in accordance with the application and data communication technology when accessed via a network interface.

In some embodiments, all of the elements shown in FIG. 2B need not be present to practice the present systems and methods. The devices and subsystems can be interconnected in different ways from that shown in FIG. 2B. In some embodiments, an aspect of some operation of a system, such as that shown in FIG. 2B, may be readily known in the art and are not discussed in detail in this application. Code to implement the present disclosure can be stored in a non-transitory computer-readable medium such as one or more of system memory 230 or other memory. The operating system provided on input/output controller 240 may be iOS®, ANDROID®, MS-DOS®, MS-WINDOWS®, OS/2®, UNIX®, LINUX®, or another known operating system.

Figure 2C:
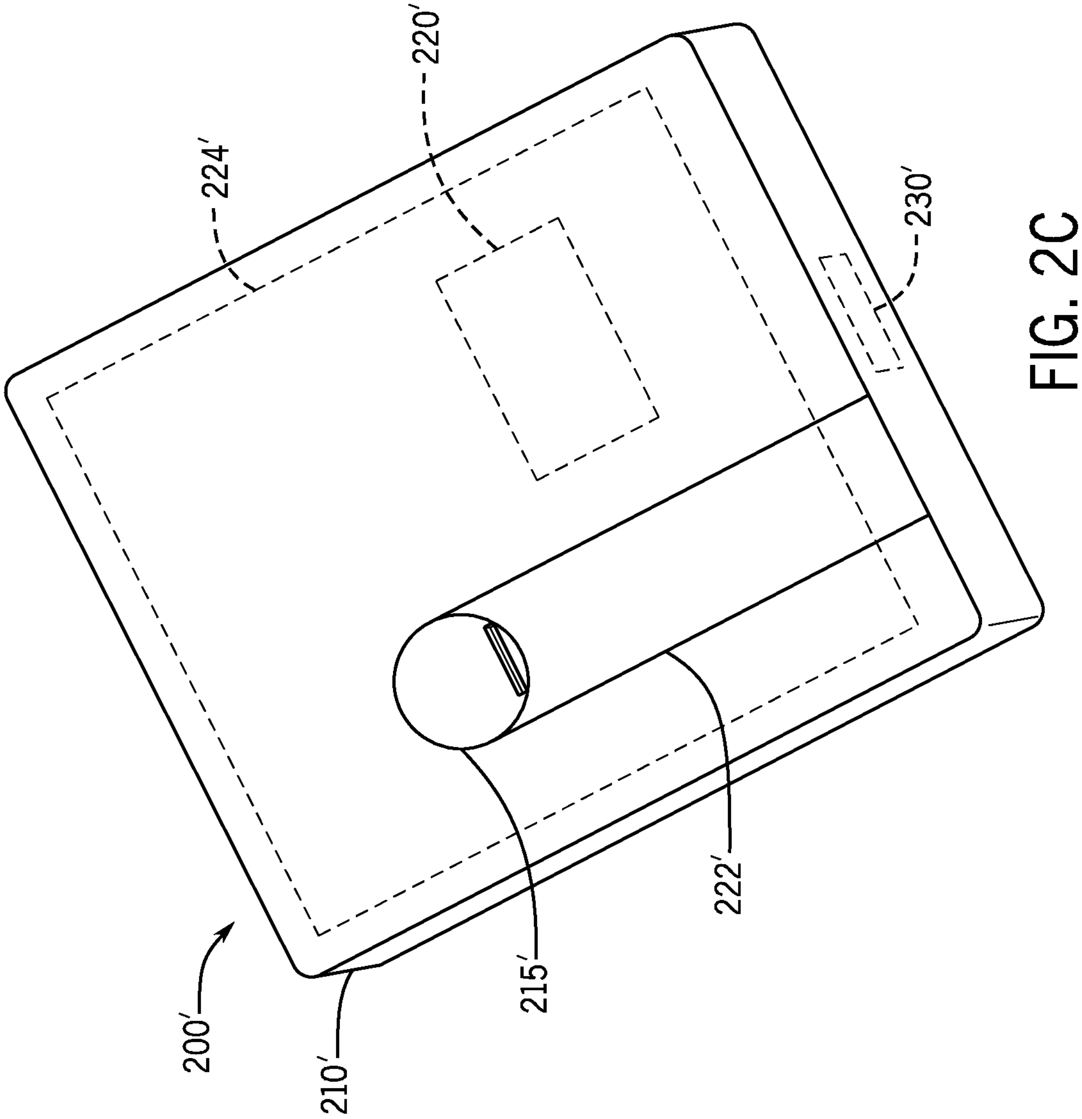
FIG. 2C is an example isometric view of an enrollment station, in accordance with various aspects of this disclosure.

An exemplary embodiment of an enrollment station 200' is shown in FIG. 2C. In the illustrated embodiment of FIG. 2C, the enrollment station 200' is configured to enable the management station 300 to gather and compile various firearm user data into a user profile. In that regard, in some embodiments, the enrollment station 200' includes at least one biometric sensor 215' and/or an RFID sensor 220' enclosed within a housing 210'.

The at least one biometric sensor 215' may collect one or more pieces of biometric data of a firearm user. For example, the at least one biometric sensor 215' may include a fingerprint scanner, a microphone for audio input, an iris or retina scanner, a camera for facial recognition, and the like. In the embodiment depicted, the at least one biometric sensor 215' is defined at the end of a finger groove 222' on the exterior of the housing 210' to support accurate positioning of the user's finger on the sensor 215'. In some embodiments, the biometric sensor(s) 215' may read or measure light, temperature, speed, electrical capacity, and other types of energies to gather biometric data. The RFID sensor 220' may gather information from an RFID tag associated with the user. For example, a police officer may have a ring that includes an RFID tag that can be read by an RFID sensor 220' and which can be used for authentication or for registration of an authorized user with the system disclosed herein.

The biometric sensor(s) 215' and the RFID sensor 220' are in wired communication with an enrollment station PCB 224', which has components for executing the functions of at least the modules described above with reference to FIGS. 2A and 2B. The enrollment station PCB 224' communicatively connects to the management station 300 through secure wired means, such as via a secure input/output port 230', and or secure wireless connections.

In one aspect, a secure input/output port 230' of the enrollment station can be used to communicate with a communication port of a tablet or user device 107. The enrollment station 200' can also include the ability to communicate with the tablet 107 via a wireless connection such as WiFi, Bluetooth, or other wireless protocol. As noted elsewhere herein, the tablet or user device 107 includes a special configuration to enable an authorized user to enroll in the system via the enrollment station 200'.

Figure 3B:
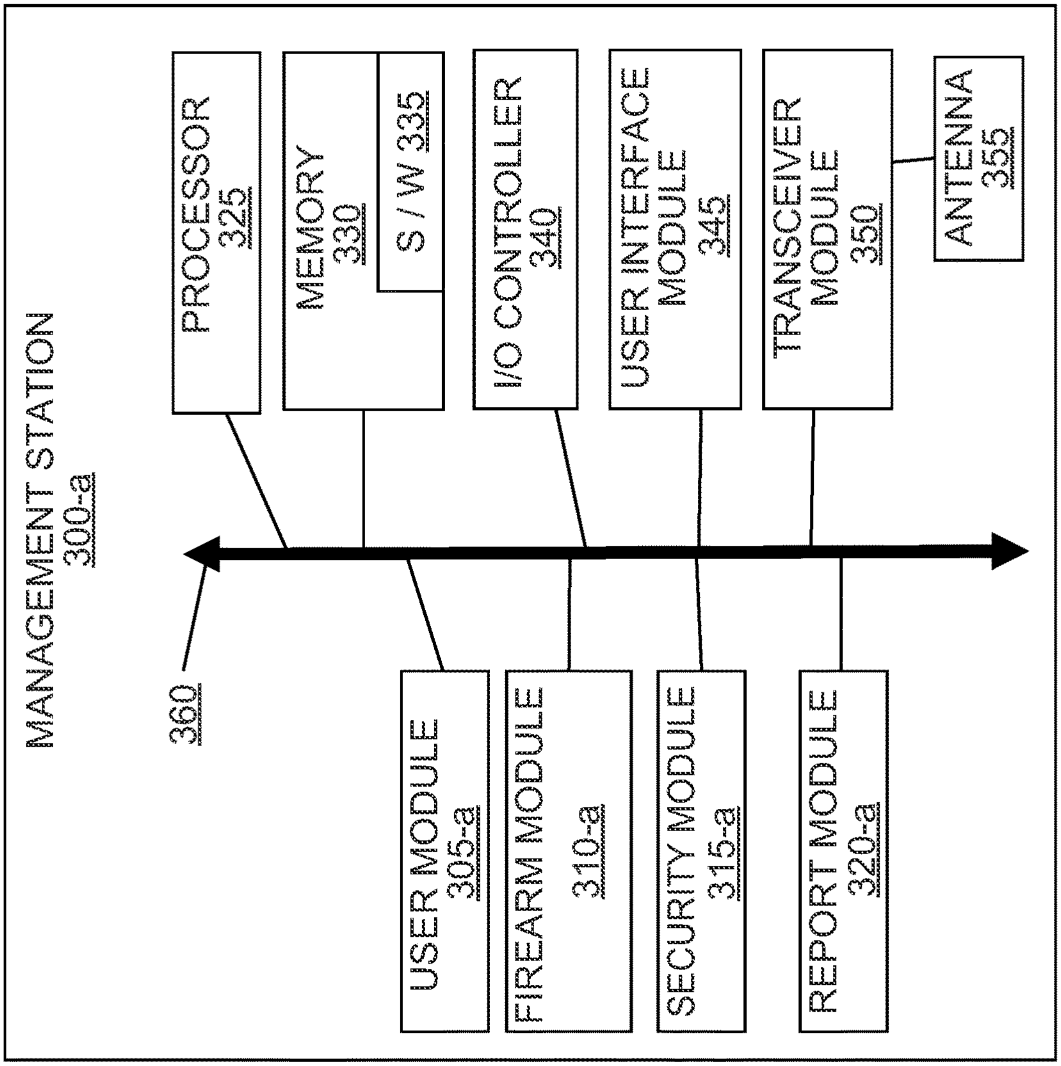
FIG. 3B is a block diagram of the example management station of the environments shown in FIG. 3A, in accordance with various aspects of this disclosure.
Figure 3A:
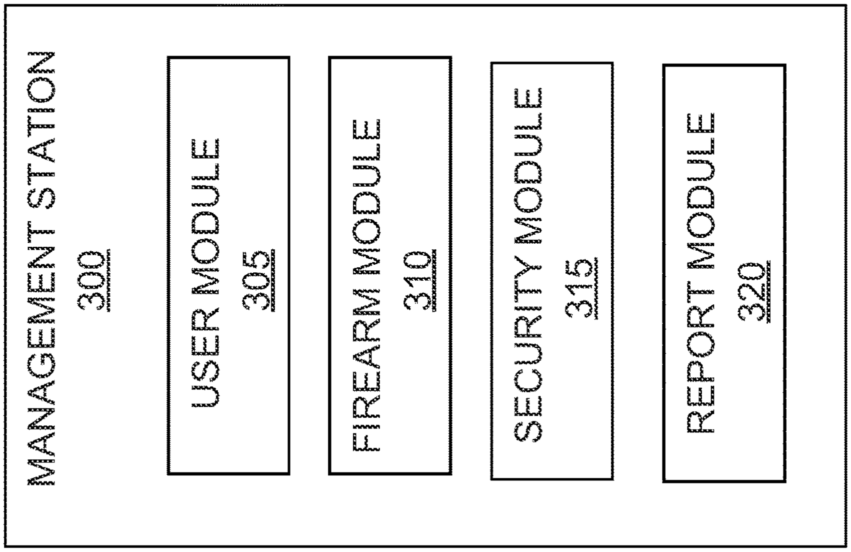
FIG. 3A is a block diagram of an example management station of the environments shown in FIG. 1, in accordance with various aspects of this disclosure.

FIG. 3A is an exemplary block diagram of a management station 300. The management station 300 may be an example of the management station 300 discussed with relation to FIG. 1. In some embodiments, the management station 300 may include a profile module 305, a firearm module 310, a security module 315, and a report module 320.

In some embodiments, the user module 305 may receive one or more profiles from the enrollment station 200-*a*. In other embodiments, the user module 305 may contain or be linked to the enrollment station 200-*a*. The user module 305 may manager user credentials and assign users to specific authentication devices, groups, squadrons, and the like. A group can refer to any grouping of people such as in a squadron, battalion, neighborhood and so forth. For example, the user module 305 may, based at least in part on personnel information, assign various user specific roles.

This may include a ranking in a hierarchy if the user is placed into a squadron. For example, if the management station 300 is run by law enforcement or military, each user may have a rank associated with their profile. This ranking may equate to various access levels to firearms include usage parameters and types of firearms. Further, each profile may have a list of acceptable firearms. For example, in some instances, prior to gaining access to a firearm, the user may require training on the specific firearm. The user may then receive approval to access the specific firearms.

In further embodiments, the group associated with the user may determine access to various firearms or types of firearms. For example, a user may have access, via an authentication device 500, to one or more firearms utilized by his squadron, battalion, or the like.

In some embodiments, users may be paired or associated with specific firearms. The user module 305, in conjunction with the firearm module 310, may assign a specific firearm or set of firearms to a specific subset of users. For example, a police officer and their partner may be assigned to at least one specific firearm. The authentication device 500 on the at least one specific firearm may be program to have the police officer and partner as primary users of the specific firearm. However, the authentication device 500 may have a secondary tier of users which, in one example, may include other officers in the precinct. In some embodiments, the authentication device 500 may have a tertiary tier of authorized users, which may include all authorized users in the division.

In some embodiments, users may have geographical restrictions to their usage. This may be a specific area the user is approved to operate a firearm such as on a firing range while being trained. It may also be mission specific or job specific. A security guard may be prevented from discharging a weapon outside of the area they were hired to protect, such as a state or a city. In another aspect, the system can also be locked and restricted by time and day, for instance, weapon is not operable when off shift and sends notification if dedocked during this time or use is attempted.

As discussed previously, the firearm module 310 may assign various authentication devices (e.g., authentication device 500) to specific firearms. The firearm module 310 may further track firearms, determine usage statistics, generate health reports on the systems, generate firearm alerts, define geo-fencing or different types of boundaries for specific firearms, and the like. For example, the firearm module 310 may pair a specific firearm with an authentication device 500. The firearm may be tracked by serial number. The firearm module 310 may then be able to track usage and other data about the firearm through the authentication device 500. The usage may include determining who accessed the firearm, if an unauthorized user attempted to discharge the firearm, a location of the firearm, discharge statistics, ammunition characteristics, reload data, and the like. If authentication fails, the system can capture a biometric signature, store it on the firearm or authentication device 500, and transmit it to the server 115 to compare the biometric signature against a criminal database to assist in finding and charging the criminal. The firearm lock (or authentication device 500) can be configured to do one-way or two-way cellular communication to send alerts, GPS location, or other sensed data such as temperature or humidity. In some aspects, if the user is prevented from using the device, a communication link could be established with a server 115 or other device such that a conversation could occur and a manual unlocking of the firearm could be provided. For example, if an officer is outside of his or her geographic jurisdiction but comes across a criminal situation and needs to use their firearm, then an ad hoc or manual authorization to use the firearm could quickly occur to override user profile data that is preventing under normal circumstances the use of the firearm. For example, a one-time token could be transmitted wirelessly to the authentication device 500 or to docking station 400 that enables use of the weapon.

The security module 315 may ensure all data transmissions and information is secured. For example, the security module 315 may require two-step authentication for users to access the management station 300, and in some embodiments, the enrollment station 200. Additionally, or alternatively, the number of users with access to the management station 300, and in some embodiments, enrollment station 200, may be limited to a predetermined number. In one aspect, a management station 300 may require two-factor authentication for all managers and possible biometric requirements for logging in. The predetermined number may vary depending upon end use of the system, but in some embodiments, the predetermined number may range from 1 person to no more than 12 persons. The security module 315 may also encrypt any data and data transmissions access, stored, or communicated to and/or from the management station 300. This may prevent unauthorized users from attempting to gain unwanted access to the system.

The report module 320 may generate one or more reports or alerts concerning firearm status. For example, the report module 320 may generate an immediate alert when a firearm is discharged. In this regard, the authentication device 500 can include a communication component that can connect with a cellular, WiFi or other system and send a report to the remote server 115 upon the firearm being fired. The report module 320 may also generate an alert when a user, via the authentication device 500, has disengaged a safety on a firearm. In some embodiments, the report module may generate an alert when an unauthorized user attempts to access a firearm. Other alerts may include low battery life of the authentication device 500, firearm reloading, exceeding one or more thresholds include duration away from a docking station or a geo-fence, ammunition type, and the like. For example, the system can report a battery status to a device.

The report module 320 may also generate one or more reports. The report type and information included therein may vary. For example, a firearm report may detail information uploaded from an authentication device 500 regarding a specific firearm. This may include duration away from docking station, a user who removed the firearm from a docking station, any attempts—successfully or unsuccessfully—to gain access to discharge the firearm, discharge data, ammunition data, route or movement tracking, and the like. A squad report may provide user statistics in relation to firearms. For example, a squadron report may list users who accessed firearms, users who discharge firearms, and other information as required or desired. The reports may be daily, weekly, monthly, or any other time predetermined interval. A report can cover a single police shift, or a group of weekend shifts, for example. In some embodiments, if an incident has occurred, personnel may generate specific reports during the times of the incident to generate granular information surrounding the incident.

FIG. 3B shows a block diagram of a management station 300-*a* for use in a firearm authentication and management system. The management station 300-*a* may be an example of a management station 300 discussed with reference to FIGS. 1 and/or 3A. The management station 300-*a* may include a user module 305-*a*, a firearm module 310-*a*, and a security module 315-*a*.

The management station 300-*a* may further include a processor module 325, and memory 330, including software/firmware code (SW) 335. The management station 300-*a* may also have an input/output controller (I/O) 340 and user interface module 345. In some embodiments, the management station 300-*a* may also have a transceiver module 350 coupled to one or more antennas 355. All of the components of the management station 300-*a* may communicate, directly or indirectly, with one another via one or more buses 360.

In some embodiments, the transceiver module 350 may communicate bi-directionally via the one or more antennas 355, wired links, and/or wireless links with one or more networks or other devices as described above. For example, the transceiver module 350 may communicate bi-directionally with the enrollment station 300, docking station 400, authentication device 500, remote server 115, and/or remote storage. The transceiver module 350 may include a modem to modulate the packets and provide the modulated packets to the one or more antennas 355 for transmission, and to demodulate packets received from the one or more antenna 355. While a single antenna 355 is shown, the enrollment station 300-*a* may have multiple antennas 355 which may enable concurrently transmitting or receiving multiple transmissions. In some embodiments, one element of the management station 300-*a* (e.g., the one or more antennas 355, transceiver module 350, etc.) may provide a direct connection to a remote server (e.g., remote server 115) via a direct network link to the Internet via a POP (point of presence). In an embodiment, one element of the enrollment station 300-*a* (e.g., the one or more antennas 355, the transceiver module 350, etc.) may provide a connection using wireless techniques, including digital cellular telephone connection, Cellular Digital Packet Data (CDPD) connection, digital satellite data connection, and/or another connection.

The signals associated with the system may include wireless communication signals such as radio frequency, electromagnetics, local area network (LAN), wide area network (WAN), virtual private network (VPN), wireless network (using 802.11, for example), 245 MHz, Z-WAVE®, cellular network (using 2G and/or LTE, for example), and/or other signals. The one or more antennas 355 and/or transceiver module 350 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 355 may receive signals or information specific and/or exclusive to itself. In other embodiments, each antenna 355 may receive signals or information not specific or exclusive to itself. In further embodiments, the signals associated with the system may include wired communications signals.

The user interface module 345 may enable a person to interact with the management station 300-*a*. For example, the user interface module 345 may include a visual display such as a display screen, an audio device such as a speaker, and various input devices such as a keyboard, touch-screen, microphone, or the like. In some embodiments, the user interface module 345 may communicate with a remote or external device through the I/O controller 340.

The memory 330 may include random access memory (RAM), read only memory (ROM), flash RAM, other types of memory, or some combination thereof. The memory 330 may store computer-readable, computer-executable software/firmware code 335 which may include instructions that, when executed, cause the processor module 325 to perform various functions described in this disclosure (e.g., registering a new user, gathering biometric data, registering an RFID device, etc.). Alternatively, the software/firmware code 335 may not be directly executable by the processor module 335 but may cause a computer to perform functions described herein. Alternatively, the computer-readable, computer-executable software/firmware code 335 may not be directly executable by the processor module 325 but may be configured to cause a computer (e.g., when compiled and executed) to perform functions described herein. The processor module 325 may include an intelligent hardware device, e.g., a central processing unit (CPU), a microcontroller, an application-specific integrated circuit (ASIC), etc.

In some embodiments, the memory 330 can contain, among other things, the Basic Input-Output system (BIOS) which may control basic hardware and/or software operation such as the interaction with peripheral components or devices. For example, the user module 305-*a*, firearm module 310-*a*, the security module 315-*a*, and the report module 320-*a* to implement the present systems and methods may be stored within the system memory 330. Applications may be resident within the enrollment station, e.g., a hard disk drive or other storage medium, alternatively or additionally, applications can be in the form of electronic signals modulated in accordance with the application and data communication technology when accessed via a network interface.

In some embodiments, all of the elements shown in FIG. 3B need not be present to practice the present systems and methods. The devices and subsystems can be interconnected in different ways from that shown in FIG. 3B. In some embodiments, an aspect of some operation of a system, such as that shown in FIG. 3B, may be readily known in the art and are not discussed in detail in this application. Code to implement the present disclosure can be stored in a non-transitory computer-readable medium such as one or more of system memory 330 or other memory. The operating system provided on input/output controller 340 may be iOS®, ANDROID®, MS-DOS®, MS-WINDOWS®, OS/2®, UNIX®, LINUX®, or another known operating system.

Figure 4B:
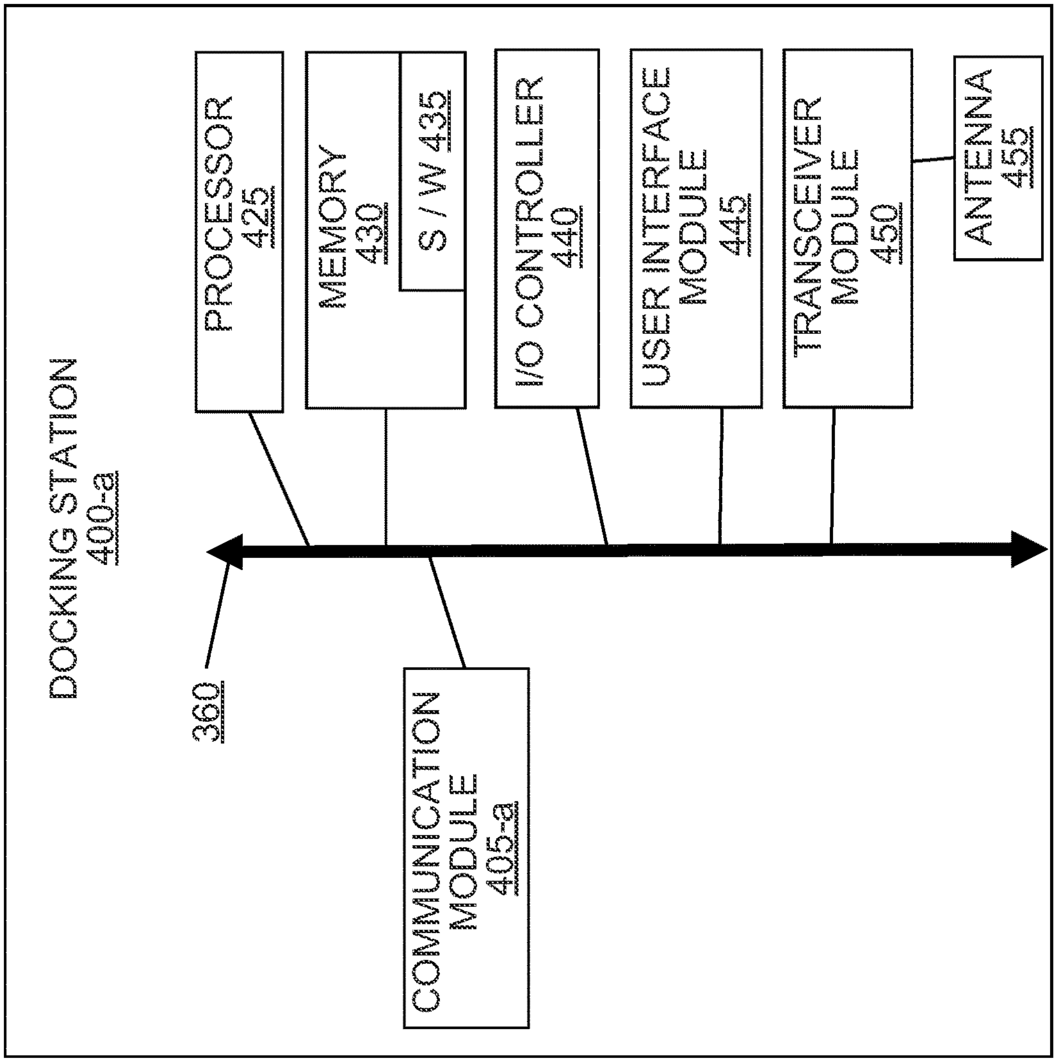
FIG. 4B is a block diagram of the example docking station of the environments shown in FIG. 4A, in accordance with various aspects of this disclosure.
Figure 4A:
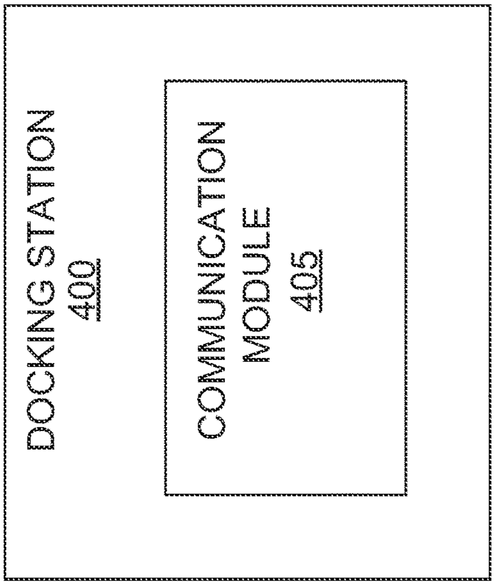
FIG. 4A is a block diagram of an example docking station of the environments shown in FIG. 1, in accordance with various aspects of this disclosure.

FIG. 4A is an exemplary block diagram of a docking station 400. The docking station 400 may be an example of one of the docking stations 400 discussed with relation to FIG. 1. In some embodiments, the docking station 400 may include a communication module 405. The docking station 400 can be physically configured according to its environment. For example, a first type of docking station 400 may be configured in a vehicle or a certain type of vehicle, while a second type of docking station 400 may be configured in a home or office.

The communication module 405 may upload and/or download data and statistics from a connected authentication device. The connection may occur when the authentication device is charging—either via a wire or wirelessly. The communication device 405 may upload data to the authentication device such as the different tiers of users with access to the firearm and various other parameters established by personnel. This may include allowed ammunition, geo-fencing, and the like.

The communication module 405 may also download information from the authentication device 500 to communicate with the management station (e.g., management station 300).

FIG. 4B shows a block diagram of a docking station 400-*a* for use in a firearm authentication and management system. The docking station 400-*a* may be an example of a docking station 400 discussed with reference to FIGS. 1 and/or 4A. The docking station 400-*a* may include a communication module 405-*a*.

The docking station 400-*a* may further include a processor module 425, and memory 430, including software/firmware code (SW) 435. The docking station 400-*a* may also have an input/output controller (I/O) 440 and user interface module 445. In some embodiments, the docking station 400-*a* may also have a transceiver module 450 coupled to one or more antennas 455. All of the components of the docking station 400-*a* may communicate, directly or indirectly, with one another via one or more buses 460.

In some embodiments, the transceiver module 450 may communicate bi-directionally via the one or more antennas 455, wired links, and/or wireless links with one or more networks or other devices as described above. For example, the transceiver module 450 may communicate bi-directionally with the enrollment station 200, management station 300, authentication device 500, remote server 115, and/or remote storage. The transceiver module 450 may include a modem to modulate the packets and provide the modulated packets to the one or more antennas 455 for transmission, and to demodulate packets received from the one or more antenna 455. While a single antenna 455 is shown, the enrollment station 400-*a* may have multiple antennas 455 which may enable concurrently transmitting or receiving multiple transmissions. In some embodiments, one element of the docking station 400-*a* (e.g., the one or more antennas 455, transceiver module 450, etc.) may provide a direct connection to a remote server (e.g., remote server 115) via a direct network link to the Internet via a POP (point of presence). In an embodiment, one element of the docking station 400-*a* (e.g., the one or more antennas 455, the transceiver module 450, etc.) may provide a connection using wireless techniques, including digital cellular telephone connection, Cellular Digital Packet Data (CDPD) connection, digital satellite data connection, and/or another connection.

The signals associated with the system may include wireless communication signals such as radio frequency, electromagnetics, local area network (LAN), wide area network (WAN), virtual private network (VPN), wireless network (using 802.11, for example), 445 MHz, Z-WAVE®, cellular network (using 4G, 5G and/or LTE, for example), and/or other signals. The one or more antennas 455 and/or transceiver module 450 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 455 may receive signals or information specific and/or exclusive to itself. In other embodiments, each antenna 455 may receive signals or information not specific or exclusive to itself. In further embodiments, the signals associated with the system may include wired communications signals.

The user interface module 445 may enable a person to interact with the docking station 400-*a*. For example, the user interface module 445 may include a visual display such as a display screen, an audio device such as a speaker, and various input devices such as a keyboard, touch-screen, microphone, or the like. In some embodiments, the user interface module 445 may communicate with a remote or external device through the I/O controller 440.

The memory 430 may include random access memory (RAM), read only memory (ROM), flash RAM, other types of memory, or some combination thereof. The memory 430 may store computer-readable, computer-executable software/firmware code 435 which may include instructions that, when executed, cause the processor module 425 to perform various functions described in this disclosure (e.g., communicating with an authentication device, charging an authentication device, communicating with a management station, etc.). Alternatively, the software/firmware code 435 may not be directly executable by the processor module 435 but may cause a computer to perform functions described herein. Alternatively, the computer-readable, computer-executable software/firmware code 435 may not be directly executable by the processor module 425 but may be configured to cause a computer (e.g., when compiled and executed) to perform functions described herein. The processor module 425 may include an intelligent hardware device, e.g., a central processing unit (CPU), a microcontroller, an application-specific integrated circuit (ASIC), etc.

In some embodiments, the memory 430 can contain, among other things, the Basic Input-Output system (BIOS) which may control basic hardware and/or software operation such as the interaction with peripheral components or devices. For example, the communication module 405-*a* to implement the present systems and methods may be stored within the system memory 430. Applications may be resident within the docking station, e.g., a hard disk drive or other storage medium, alternatively or additionally, applications can be in the form of electronic signals modulated in accordance with the application and data communication technology when accessed via a network interface.

In some embodiments, all of the elements shown in FIG. 4B need not be present to practice the present systems and methods. The devices and subsystems can be interconnected in different ways from that shown in FIG. 4B. In some embodiments, an aspect of some operation of a system, such as that shown in FIG. 4B, may be readily known in the art and are not discussed in detail in this application. Code to implement the present disclosure can be stored in a non-transitory computer-readable medium such as one or more of system memory 430 or other memory. The operating system provided on input/output controller 440 may be iOS®, ANDROID®, MS-DOS®, MS-WINDOWS®, OS/2®, UNIX®, LINUX®, or another known operating system.

Figure 5B:
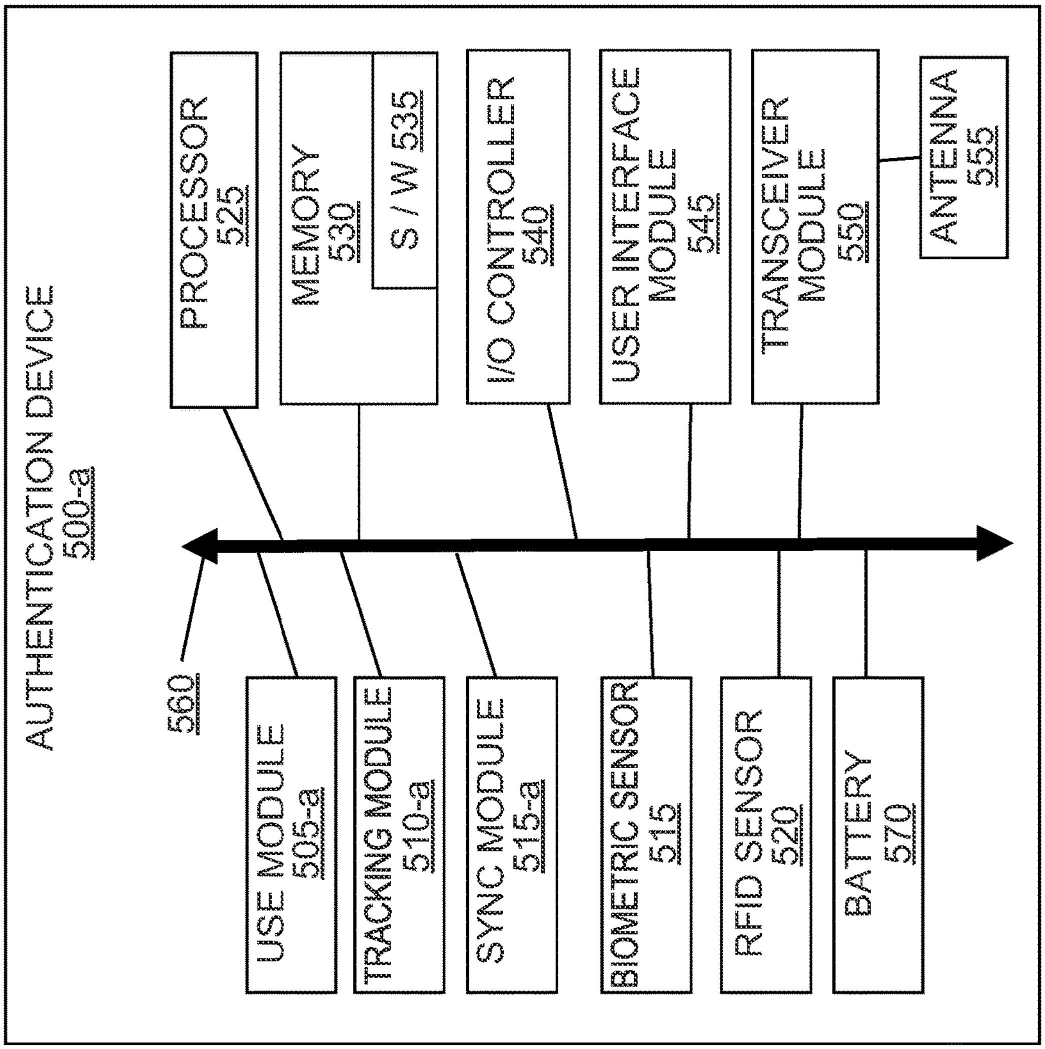
FIG. 5B block diagram of the example authentication device station of the environments shown in FIG. 5A, in accordance with various aspects of this disclosure.
Figure 5A:
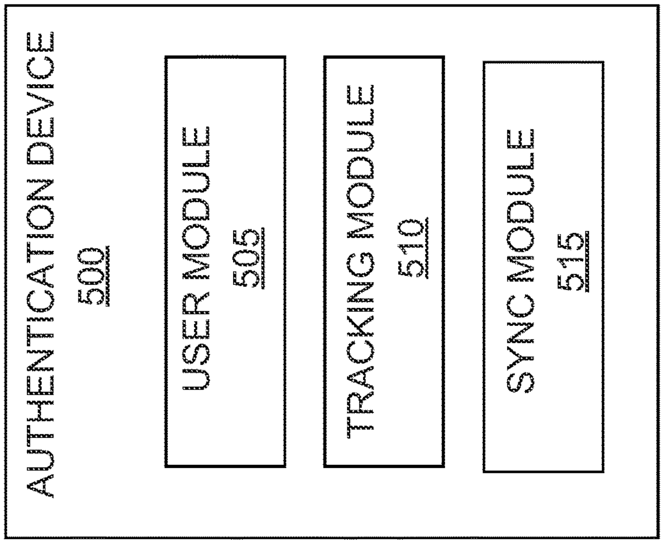
FIG. 5A is a block diagram of an example authentication device of the environments shown in FIG. 1, in accordance with various aspects of this disclosure.

FIG. 5A is an exemplary block diagram of an authentication device 500. The authentication device 500 may be an example of the authentication device 500 discussed with relation to FIG. 1. In some embodiments, the authentication device 500 may include a use module 505, a tracking module 510, and a sync module.

The use module 505 may include all of the identifying information of an authorized user of the authentication device 500 associated with a firearm. In some embodiments, the use module 505 may categorize or store the information in varying tiers of users. For example, a first tier user may comprise a user specifically associated with the specific firearm. This may be a firearm assigned to the user on a more permanent basis or may be a daily assignment, or may be based on some other specific time frame such as a work shift. The first tier may change as the users assigned to the firearm change. A second tier of users may include a larger group of users authorized to use the firearm in charge. An example includes a group of law enforcement people associated with a police precinct. A third tier of users may include a larger group of people than the second tier. The third tier of users may additionally include users authorized to use the firearm associated with the authentication. An example of third tier users may include all law enforcement personal in a district. Another tier might be based on time or geography. Information within a tier might not be contiguous, such as different time slots or different cities that are separated.

When a user attempts to access the firearm via the authentication device 500, the use module 505 may first compare the attempted users' credentials with the first tier of users. This group is small and provide enable faster authentication due to the lower number of profiles to parse. If a match is not found in the first tier of users, the use module 505 may search a second tier of users. Again, if a match is not found, the use module 505 may access the third tier of users. If a match is still not located, the use module 505 may deny the potential user access to the firearm. Additionally, the use module 505 may store the user's information (i.e. biometric data or other qualifying data), and communicate this data to the track module 510. Additionally, if the potential user is granted access, the use module 505 may store that information in the track module 510. The user module 505 might also compare the time or location to a tier related to such information.

The track module 510 may track all parameters pertaining to the authentication device 500 and the firearm as discussed herein. For example, the track module 510 may track the number of both authorized attempts and unauthorized attempts access to the firearm. The track module 510 may also track the type of ammunition in the magazine associated with the firearm. For example, some firearms may be regulated to only be discharged with non-lethal rounds. The authentication device 500 may determine when ammunition other than non-lethal round are loaded into the firearm and prevent user access to the firearm under those circumstances and track all ammunition data.

The track module 510 may also record the number of discharges, frequency between discharges, timing between discharges, time of discharge, location of discharge, and the like. In some embodiments, the authentication device 500 may be equipped with a speaker and may detect one or more warnings issued to a potential target prior to a law enforcement office or other personnel discharging the weapon.

The track module 510 may also track the geographical location of the firearm. The authentication device 500 on a firearm may include a GPS tracking component, cellular component, RFID tag, or other mechanism for transmitting or enabling a location of the device to be tracked. The system also send the GPS location of the firearm when the firearm is fired/unlocked or travels outside its geo fence or gets dedocked when it should not be undocked. The track module 510 may determine the docking times of the authentication device 500 on a docking station. The track module 510 may track the battery status and life of the authentication device 500.

The sync module 515 may compile all of the data from the use module 505 and the track module 510 and transfer the data to one of a docking station (e.g., docking station 400) or management station (e.g., management station 300). The data may transfer when the authentication device 500 is in communication with either the docking station 400 or the management station 300. The sync module 515 may also upload information from either the docking station or the management station when in communication with either. Secure communications, encryption of data, tunneling, and so forth can be used to secure the communication between components.

FIG. 5B shows a block diagram of an authentication device 500-*a* for use in a firearm authentication and management system. The authentication device 500-*a* may be an example of an authentication device 500 discussed with reference to FIGS. 1 and/or 9. The authentication device 500-*a* may include a use profile 505-*a*, tracking module 510-*a*, and sync module 515-*a*. In further embodiments, the authentication device 500-*a* may also include a biometric sensor 515 and an RFID sensor 520.

The authentication device 500-*a* may further include a processor module 525, and memory 530, including software/firmware code (SW) 535. The authentication device 500-*a* may also have an input/output controller (I/O) 540 and user interface module 545. In some embodiments, the authentication device 500-*a* may also have a transceiver module 550 coupled to one or more antennas 555. All of the components of the authentication device 500-*a* may communicate, directly or indirectly, with one another via one or more buses 560.

In some embodiments, the transceiver module 550 may communicate bi-directionally via the one or more antennas 555, wired links, and/or wireless links with one or more networks or other devices as described above. For example, the transceiver module 550 may communicate bi-directionally with the enrollment station 200, management station 300, docking station 400, remote server 115, and/or remote storage. The transceiver module 550 may include a modem to modulate the packets and provide the modulated packets to the one or more antennas 555 for transmission, and to demodulate packets received from the one or more antenna 555. While a single antenna 555 is shown, the authentication device 500-*a* may have multiple antennas 555 which may enable concurrently transmitting or receiving multiple transmissions. In some embodiments, one element of the authentication device 500-*a* (e.g., the one or more antennas 555, transceiver module 550, etc.) may provide a direct connection to a remote server (e.g., remote server 115) via a direct network link to the Internet via a POP (point of presence). In an embodiment, one element of the authentication device 500-*a* (e.g., the one or more antennas 555, the transceiver module 550, etc.) may provide a connection using wireless techniques, including digital cellular telephone connection, Cellular Digital Packet Data (CDPD) connection, digital satellite data connection, and/or another connection.

A battery 570 is shown in the authentication device 500-*a*. A battery status can be reported to the docking station 400-*a* or other device as part of the processes disclosed herein. The battery 570 can be charged by the docking station 400-*a*, through a battery replacement approach, through a solar panel configured on the firearm or on the docking station 400-*a*, or by other approaches.

The signals associated with authentication device 500-*a* may include wireless communication signals such as radio frequency, electromagnetics, local area network (LAN), wide area network (WAN), virtual private network (VPN), wireless network (using 802.11, for example), 545 MHz, Z-WAVE®, cellular network (using 5G and/or LTE, for example), and/or other signals. The one or more antennas 555 and/or transceiver module 550 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 555 may receive signals or information specific and/or exclusive to itself. In other embodiments, each antenna 555 may receive signals or information not specific or exclusive to itself. In other embodiments, the signals associated with the authentication device 500-*a* may include various wired connections.

In some embodiments, the authentication device 500-*a* may include one or more biometric sensors 515 and an RFID sensor 520. The one or more biometric sensors 515 may collect one or more pieces of biometric data of a firearm user. For example, the one or more biometric sensors may include a fingerprint scanner, a microphone for audio input, an iris or retina scanner, a camera or other device for facial recognition, and the like. In some embodiments, the one or more biometric sensors 515 may read or measure light, temperature, speed, electrical capacity, and other types of energies to gather biometric data. The RFID sensor 520 may gather information from an RFID tag associated with the user. The one or more biometric sensors 515 and/or the RFID sensor 520 may connect to some element of the system (e.g., firearm authentication and tracking system 100) via a network using one or more wired and/or wireless connections 110. The biometric sensor 515 and RFID sensor 520 may work in conjunction with the user module 505-*a* to determine if a user has authorized access to the associated firearm.

In some embodiments, the authentication device 500-*a* may include a user interface module 545. The user interface module 545 may enable a person to interact with the authentication device 500-*a*. For example, the user interface module 545 may include a visual display such as a display screen, an audio device such as a speaker, LED light, and various input devices such as a keyboard, touch-screen, microphone, sensor, or the like. A haptic or movement component can also provide input to the user for some features, such as when authentication fails. In some embodiments, the user interface module 545 may communicate with a remote or external device through the I/O controller 540.

The memory 530 may include random access memory (RAM), read only memory (ROM), flash RAM, other types of memory, or some combination thereof. The memory 530 may store computer-readable, computer-executable software/firmware code 535 which may include instructions that, when executed, cause the processor module 525 to perform various functions described in this disclosure (e.g., authenticating a user, gathering biometric data, detecting an RFID device, etc.). Alternatively, the software/firmware code 535 may not be directly executable by the processor module 535 but may cause a computer to perform functions described herein. Alternatively, the computer-readable, computer-executable software/firmware code 535 may not be directly executable by the processor module 525 but may be configured to cause a computer (e.g., when compiled and executed) to perform functions described herein. The processor module 525 may include an intelligent hardware device, e.g., a central processing unit (CPU), a microcontroller, an application-specific integrated circuit (ASIC), etc.

In some embodiments, the memory 530 can contain, among other things, the Basic Input-Output system (BIOS) which may control basic hardware and/or software operation such as the interaction with peripheral components or devices. For example, the use module 505-*a*, the tracking module 510-*a*, and the sync module 515-*a* to implement the present systems and methods may be stored within the system memory 530. Applications may be resident within the authentication device, e.g., a hard disk drive or other storage medium, alternatively or additionally, applications can be in the form of electronic signals modulated in accordance with the application and data communication technology when accessed via a network interface.

In some embodiments, all of the elements shown in FIG. 5B need not be present to practice the present systems and methods. The devices and subsystems can be interconnected in different ways from that shown in FIG. 5B. In some embodiments, an aspect of some operation of a system, such as that shown in FIG. 5B, may be readily known in the art and are not discussed in detail in this application. Code to implement the present disclosure can be stored in a non-transitory computer-readable medium such as one or more of system memory 530 or other memory. The operating system provided on input/output controller 540 may be iOS®, ANDROID®, MS-DOS®, MS-WINDOWS®, OS/2®, UNIX®, LINUX®, or another known operating system.

The authentication device 500 described herein may include components shown and described in U.S. Pat. No. 9,651,325, hereby incorporated in its entirety by reference. In that regard, the authentication device 500 can include software and/or mechanical components that integrate with the firearm and that perform the operations described herein. For example, a pin or other structure in the firearm can be actuated by or caused to be actuated by the authentication device 500 to enable or disable a trigger. FIGS. 5C-5K illustrate an embodiment in which a pin is positioned behind a trigger of a firearm and the pin is in a locked position which prevents the movement of the trigger and thus prevents the firearm from firing or an unlocked position which enables the trigger to be pulled. As another example, a cover could be actuated by or caused to be actuated by the authentication device 500 to slide over a trigger access location to disable the firearm where a user could not access the trigger. There are various structures which can be used to either lock or block the movement of the trigger or to block access to the trigger by a user. Some example structures are disclosed below.

A specific example of an authentication device 500' is shown in FIGS. 5C-5K. In the illustrated embodiments of FIGS. 5C-5G shown herein, the authentication device 500' includes a trigger lock assembly 502' shown attached to a firearm FA of an "Assault Rifle" type (e.g., an "AR-15," hereinafter "AR"); however, the embodiments described herein are intended for use with any suitable firearm to prevent accidental and unauthorized discharge.

Figure 5C:
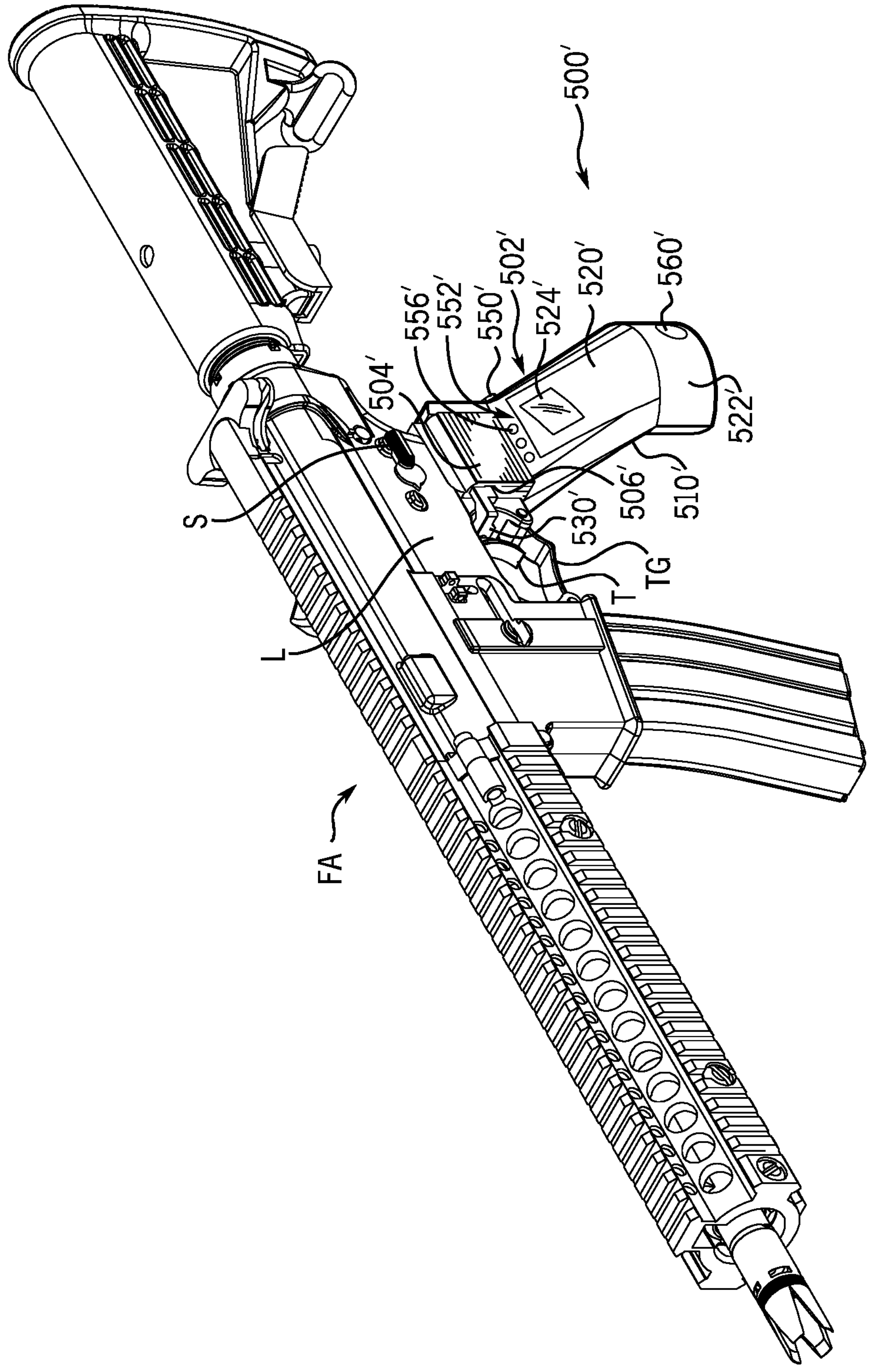
FIG. 5C illustrates an isometric view of an example authentication device in connection with a firearm, in accordance with various aspects of this disclosure.
Figure 5D:
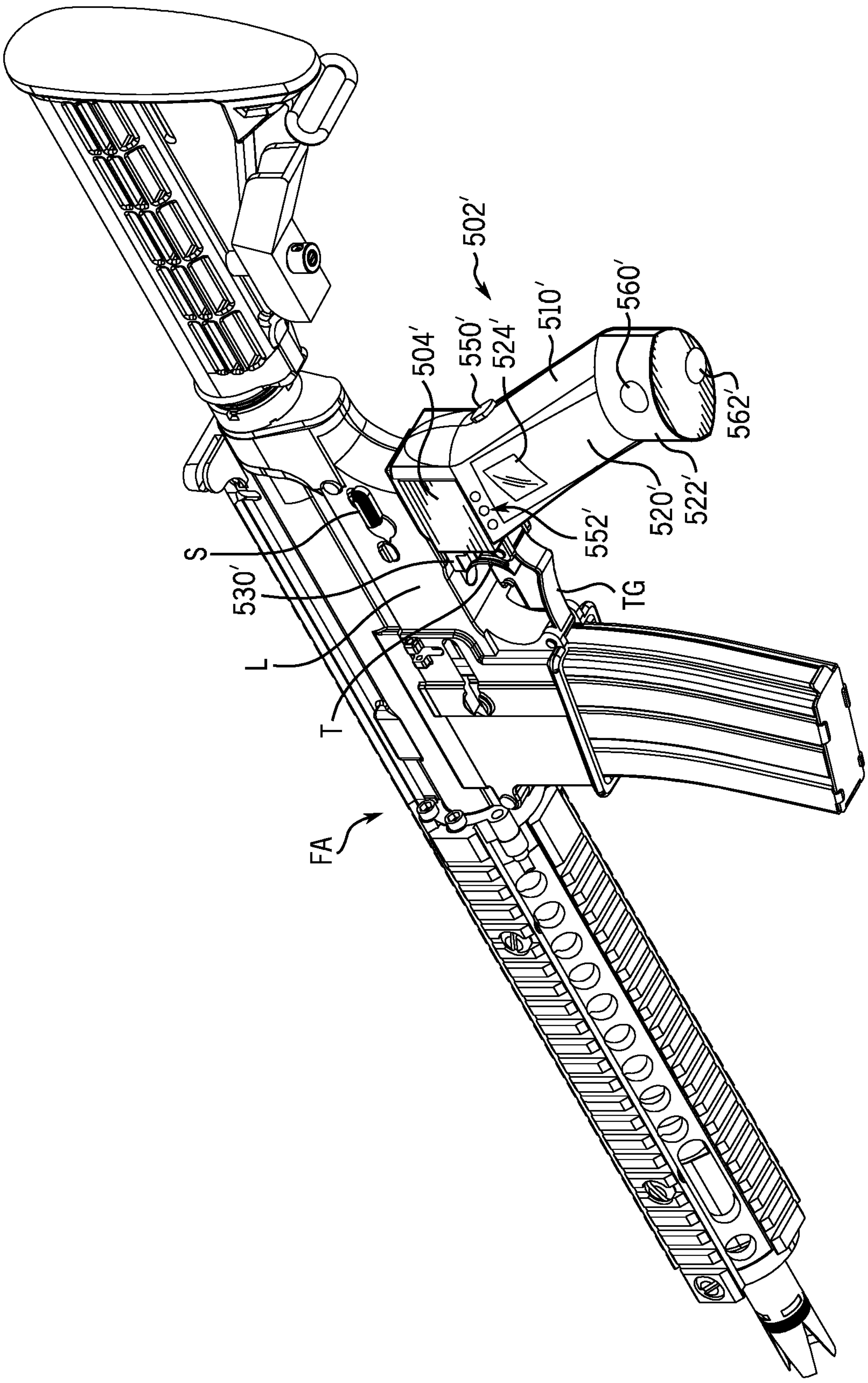
FIG. 5D illustrates an isometric view of the example authentication device in connection with the firearm, in accordance with various aspects of this disclosure.

Referring to FIGS. 5C and 5D, the trigger lock assembly 502' generally includes a firearm interface portion 504' including a slot 506', the firearm interface portion 504' couplable to a lower assembly L of the firearm FA, a grip portion 510', a cover portion 520', a cover portion 522', a fingerprint scanner 524', a trigger interference member 530' (or locking bar) capable of blocking actuation of a trigger T contained within a trigger guard TG, a continuous fire button 550', a cover portion access lock 560', and a manual authentication component 562'. The grip portion 510' also includes status light emitting diodes (LEDs) 552'. In one aspect, a vibration sensor can be configured in the grip as well for haptic feedback of status.

Note that the fingerprint scanner 524' can be configured at any location on the grip portion 510' or elsewhere on the firearm. For example, the fingerprint scanner 524' could be configured on the trigger T itself or on another location. When the user authenticates with the firearm, the trigger interference member 530' will shift back into the unlocked position as shown in the transition from FIG. 5E to FIG. 5F. Also note that the fingerprint scanner 524' represents any biometric sensor such as a sensor for facial recognition, iris detection and so forth. In one aspect feature 552' can slide down and allow the trigger interference member 530' to be able to slide back upon firing the fire arm. Feature 552' will be mechanically retained by 532 and 534 which may or may not be magnets. For example, it may be mechanically latched with a piece of spring steel/plastic to catch the plunger and retain it until the grip is released.

In one aspect, the LEDs 552' that can identify for the user the status of the charge or the status of the trigger lock assembly in terms of its operation (battery power) can be configured in the grip portion 510' or at another location of the firearm lower assembly L of the firearm FA. The configuration can include being embedded in an indentation or cavity 570 (shown in FIGS. 5J and 5K) in the firearm lower assembly L that is configured such that the LEDs 552' can be viewed from the rear of the firearm but not viewable from a front portion of the firearm. In this manner, the user of the firearm can see the status but a suspect or person on the other side of the firearm could not see the LED status 552'.

The trigger lock assembly 502' is configured to interface the hand of a user of the firearm FA. In some embodiments, the trigger lock assembly 502' replaces the grip of the firearm FA as provided by the original equipment manufacturer (OEM). In other embodiments, the trigger lock assembly 502' components are integrated into the firearm FA and do not replace the grip.

As shown in FIG. 5C, the firearm interface portion 504' provides a mounting link between the lower assembly L of the firearm FA and the grip portion 510'. In the illustrated embodiment, the firearm interface portion 504' is shown as integral to the grip portion 510'; however, in other embodiments, the firearm interface portion 504' is a separated component from the grip portion 510' such that a single style of grip portion 510' may be specified in conjunction with numerous styles of firearm interface portions.

Figure 5E:
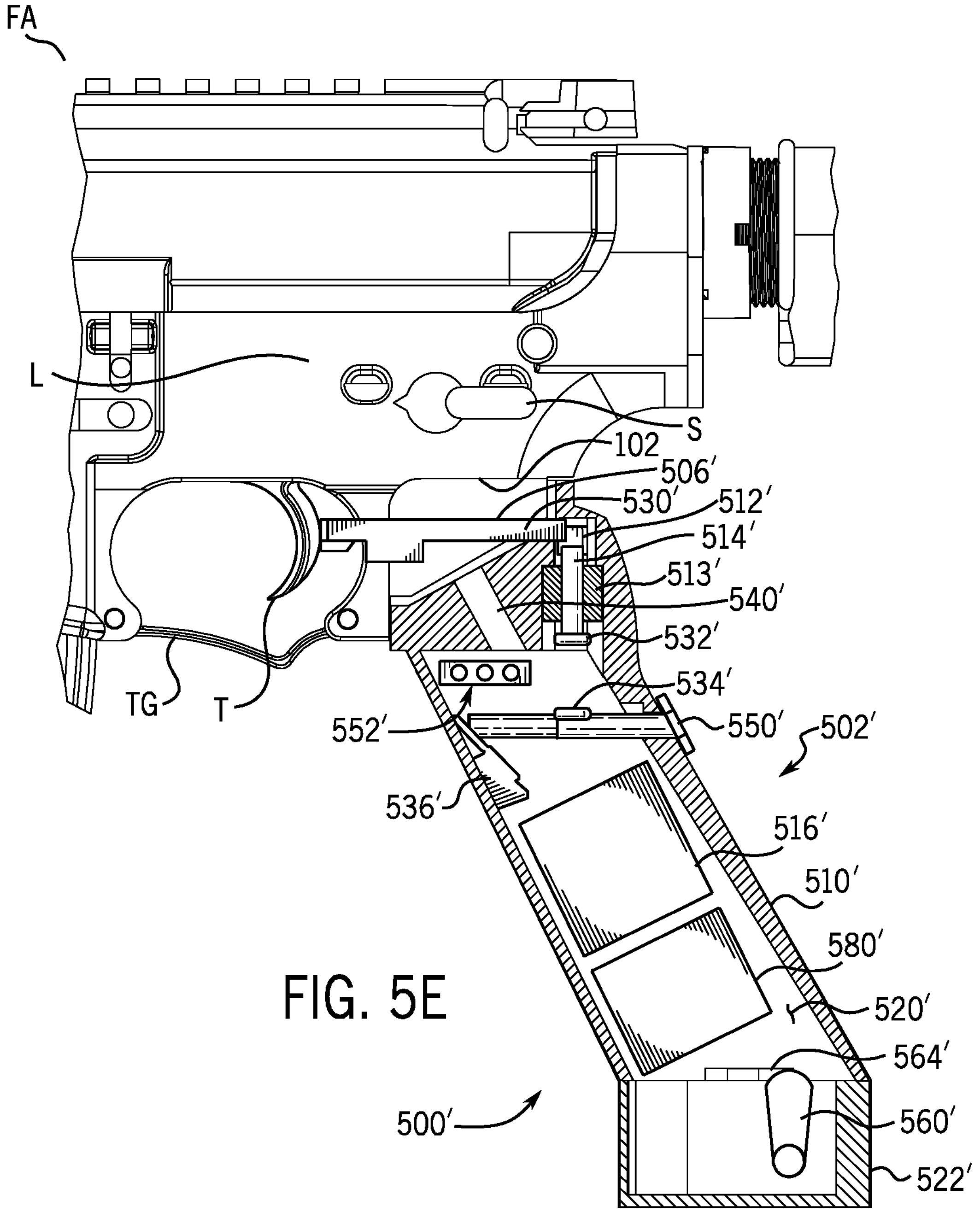
FIG. 5E illustrates a cross-sectional view of the example authentication device in connection with a portion of the firearm in a locked position, in accordance with various aspects of this disclosure.
Figure 5F:
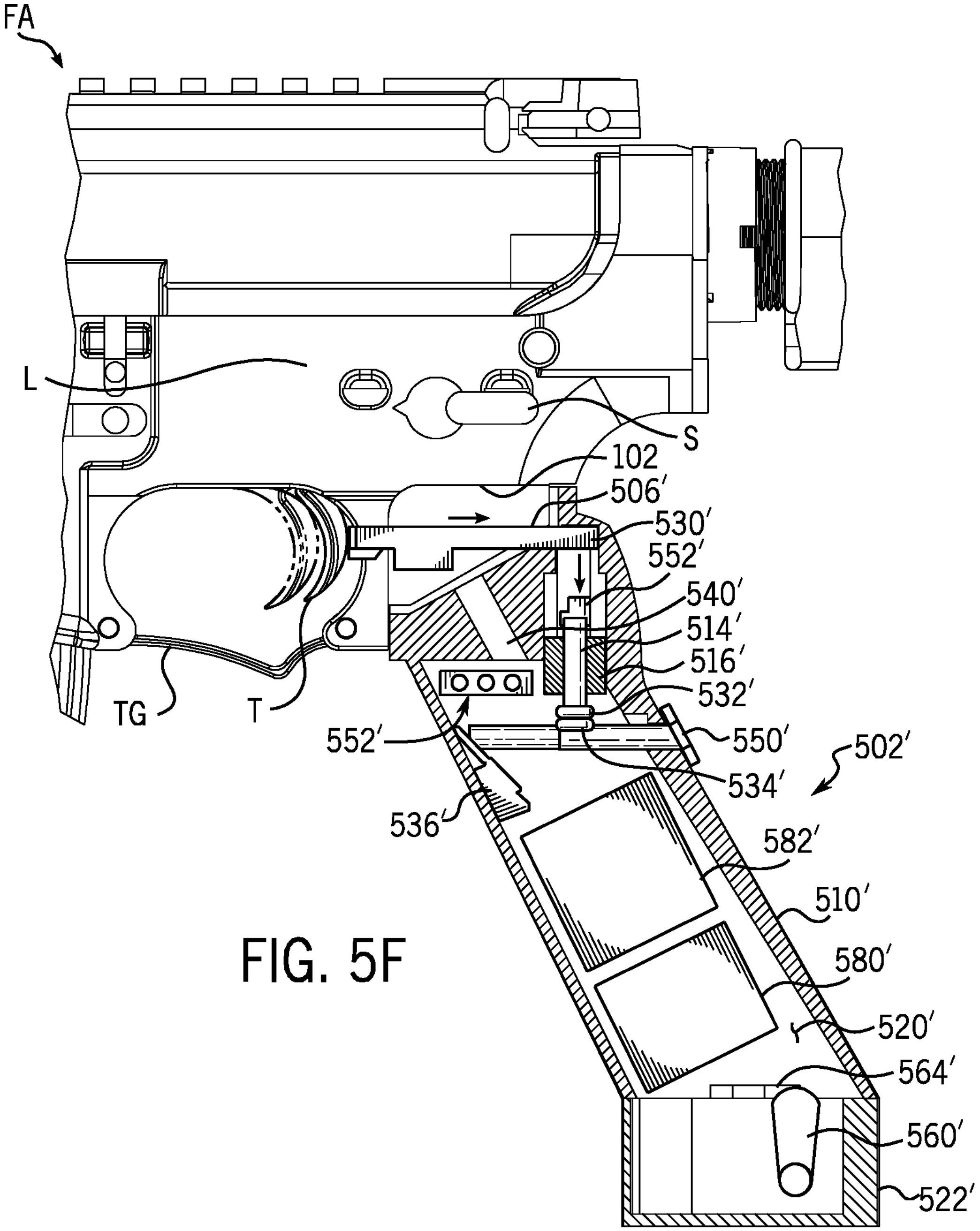
FIG. 5F illustrates a cross-sectional view of the example authentication device in connection with a portion of the firearm in an unlocked position, in accordance with various aspects of this disclosure.
Figure 5G:
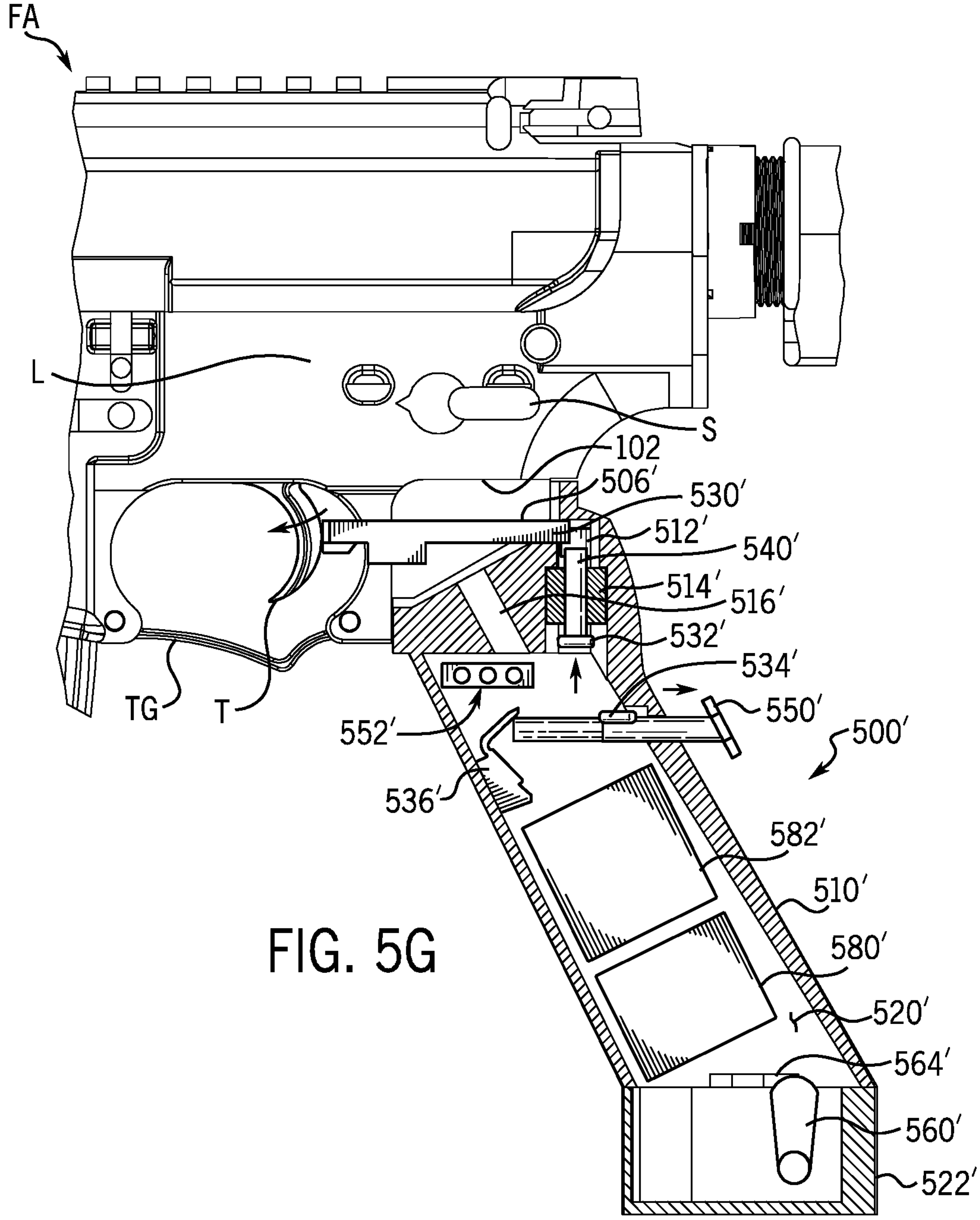
FIG. 5G illustrates a cross-sectional view of the example authentication device in connection with a portion of the firearm in the locked position, in accordance with various aspects of this disclosure.

Now turning to FIGS. 5E-5G, detailed views are shown in cutaway of the trigger lock assembly 502' transitioning through various functional states (with wiring connections between the components omitted for clarity). FIG. 5E illustrates a locked state in which the trigger interference member 530' blocks the actuation of the trigger T.

The various components inside of the grip portion 510' include a battery 580', a main printed circuit board (PCB) 582' with at least one central processing unit (CPU, not shown), a manual lock 564' for manual override of the authentication system, a continuous fire button switch 536', a trigger interference member block 512', a block plunger 514', a plunger sleeve 516', a plunger magnet 532', a continuous fire magnet 534', and a mounting bore 540' for coupling of the trigger lock assembly 502' to the lower assembly L of the firearm FA. The continuous fire button switch 536' could also represent an unlocking mechanism which, when the user grips the grip portion 510' of the firearm, causes the authentication system 500 to turn on and start the authentication and unlocking process.

The trigger lock assembly 502' interfaces the trigger T through the trigger interference member 530' slidably positioned in the slot 506'. An authentication and unlock sequence of the trigger lock assembly 502' is shown in the transition from FIGS. 5E to 5F. A return to locked state sequence following authentication of the trigger lock assembly 502' is shown in the transition from FIGS. 5F to 5G. For example, when a user sets down the firearm and thus no longer is putting pressure on the continuous fire button switch 536', the authentication device 500 can transition to a locked state as shown in FIG. 5E.

The process of authentication, thereby arming the firearm FA, will now be described in greater detail. Upon grasping the grip portion 510' of the trigger lock assembly 502', the user compresses the continuous fire button 550' with a palm of the user's hand, as shown in a compressed state in FIG. 5E, with a corresponding interface and movement of the continuous fire button switch 536'. In some embodiments, the continuous fire button 550' includes a self-return feature (e.g., a spring (not shown)) to ensure the continuous fire button 550' is returned to an extended position following the removal of the hand of the user, preventing further actuation of the firing system of the firearm FA without authentication.

With the continuous fire button 550' compressed, the plunger magnet 532' and the continuous fire magnet 534' are aligned with the path of the block plunger 514'. In these embodiments, the signal from the continuous fire button 550' activates the fingerprint (or other biometric) scanner 524' such that it is ready to read the fingerprint (or face, iris, etc.) of a user to commence the authentication process. In other embodiments, a separate switch accessed on the exterior of the trigger lock assembly 502' is used to activate and wake the system. In further embodiments, non-mechanical methods are used to activate the system from the low power consumption state, such as RFID, capacitive discharge, accelerometer signals, etc.

As the user wraps fingers around the grip portion 510', the middle finger aligns with the fingerprint scanner 524', which performs a scan of the user's fingerprint and sends the scan to the main PCB 582' for analysis. The main PCB 582' compares the scan with a stored authorized user fingerprint, i.e., the authorization key. Upon valid authentication, the main PCB 582' may send a signal through a diode to an electronic or electromagnetic actuator drivingly connected to the block plunger 514'. The retraction of the electronic actuator moves the block plunger 514', and thereby the trigger interference member block 512' out of the path of the trigger interference member 530' such that the trigger T can be actuated.

In another example, a facial scanner component (not shown) could be configured on a top portion of the firearm such that the user may just need to look at the firearm to be authorized.

The plunger magnet 532' and the continuous fire magnet 534' are in close proximity such that magnetic force holds the block plunger 514' in an armed position (see FIG. 5F). The block plunger 514' includes a self-return feature, e.g., a plunger spring (not shown), that returns the block plunger 514' and the trigger interference member block 512' to the locked position (away from the continuous fire magnet 534', as shown in FIG. 5G). In the illustrated embodiments, as described, the firearm FA can be fired without interruption so long as the continuous fire button 550' is depressed, keeping the magnetic bond between the plunger magnet 532' and the continuous fire magnet 534'.

Other approaches can be used to authenticate and unlock the system. For example, a blocking panel (not shown) can be used that can slide over one or both sides of the trigger T such that the user cannot access the trigger T.

In one embodiment, as described above, authentication is performed using a fingerprint scanner 524' mounted in a fingerprint scanner PCB (not shown) integrated into a window of the cover portion 520'. When a user grabs and powers up the firearm FA, it can immediately look to unlock the weapon either by biometric, RFID, or other electronics means, and any success on any of these approaches will unlock this weapon. In other embodiments, authentication is performed using an RFID USB board (not shown) paired with an RFID reader in the trigger lock assembly 502'. The RFID system suitably includes a wearable component (not shown) as the authorization key carrying device, such as a ring, bracelet, glove, necklace, etc., or a non-wearable component, such as a card, remote, key fob, etc. The system authenticates the RFID device through the RFID USB board to authorize the user and retracts the trigger interference member block 512' using the electronic actuator. In further embodiments, authentication is performed using heartbeat signature recognition, retina scan identification, facial recognition or other suitable authentication methods. A valid authentication requires enrollment of the authorization key (e.g., a fingerprint image, RFID key, heartbeat signature, facial recognition, retina scan, etc.). The enrollment process for new authorization keys, or to replace existing authorization keys, is described in further detail related to the enrollment station 200 described herein.

In another aspect, a separate device such as a user device 107 can provide the authentication, such as via a fingerprint or faceprint using the sensors built into the user device 107, and couple directly with the authentication device 500 to provide authorization.

Once the user lets go of the firearm, the mechanisms cause the trigger interference member 530' to again extend into the locked position shown in FIG. 5E. When the user or another user picks up the firearm, the authentication process begins again to determine whether the system will retract the trigger interference member 530' and enable the firearm to be used. In another aspect, a mechanical key could be used to gain access to use the weapon. The key can be inserted in a keyhole which enables the user to access a component that enables the user to manually retract the trigger interference member 530'. This can be useful if the battery on the firearm has died or cannot be charged and the firearm needs to be used. The key in one aspect would stay in place in the weapon while it is used and then to remove the key, the user would have to lock the weapon to be able to extract the key.

As noted above, one or more authentication devices 500 may communicate with one or more docking stations 400 that are configured to download firearm statistics from the authentication device(s) 500 and upload a firearm profile to the respective authentication device.

In the illustrated embodiment of FIGS. 5H-5K, the docking station 400-*a* includes a housing 576 that encloses any mechanical and electrical components of the docking station 400-*a*. The housing 576 is further configured to selectively receive or mate with a portion of a firearm for charging and/or communicating with the authentication device 500'. In that regard, the housing 576 includes a firearm-receiving cavity 572 that is generally shaped, sized, and configured to receive a bottom part 522' of the grip portion of the firearm FA, such as the grip portion 510' shown in FIGS. 5C-5G.

The docking station 400-*a* may include a locking assembly (not shown in detail) that can help urge the firearm FA into and out of mated, locking engagement with the housing 576. For instance, one or more biasing elements, such as compression springs, may be disposed within the interior firearm-receiving cavity 572 that urges the firearm into and out of mated, locking engagement with, for instance, magnets disposed within the housing 576 (that are attracted to corresponding magnets in the firearm, which can be represented by feature 562').

The docking station 400-*a* can include a printed circuit board that performs a number of functions. First, the docking station 400-*a* can manage the charging of a lithium battery configured within the firearm or the grip portion 510' of the firearm. The docking station 400-*a* can include a DC plug to power the firearm FA. The docking station 400-*a* can also establish a secure communication between itself and the firearm FA. The printed circuit board can then use its communication capability (through a network interface such as to a CAT-5 cable or other communication protocol such as WiFi, 5G or other wired or wireless protocol) to establish a virtual private network tunnel to a remote server or cloud-based computing services 115. Through these operations, the firearm FA can be recharged, the docking station 400-*a* can receive secure data from the firearm and the docking station can communicate the data received from the firearm securely with a remote server. The docking station 400-*a* can be assigned to a particular client and can encrypt all the data received from the firearm FA that is transmitted from the docking station 400-*a* to the remove server 115. Note that the docking station 400-*a* does not store any firearm related data. Furthermore, the firearm FA is never connected directly to the remote server 115 or to the Internet in one aspect, which can improve security and prevent hacking. The firearm FA is connected to the docking station 400*a* which interfaces with the firearm in a secure manner to receive data from the firearm FA. The data is then transmitted from the docking station 400-*a* to the cloud-based server 115 in a secure manner. The docking station 400-*a* basically repackages the data received from the firearm FA and transmits it to the cloud-based server 115. The only data that is on the docking station 400-*a* is data than enables the ability to establish communication and authenticate with the remote server 115 using a pre-stored key for security purposes. None of the data obtained from the firearm FA is stored on the docking station 400-*a*.

Figure 5H:
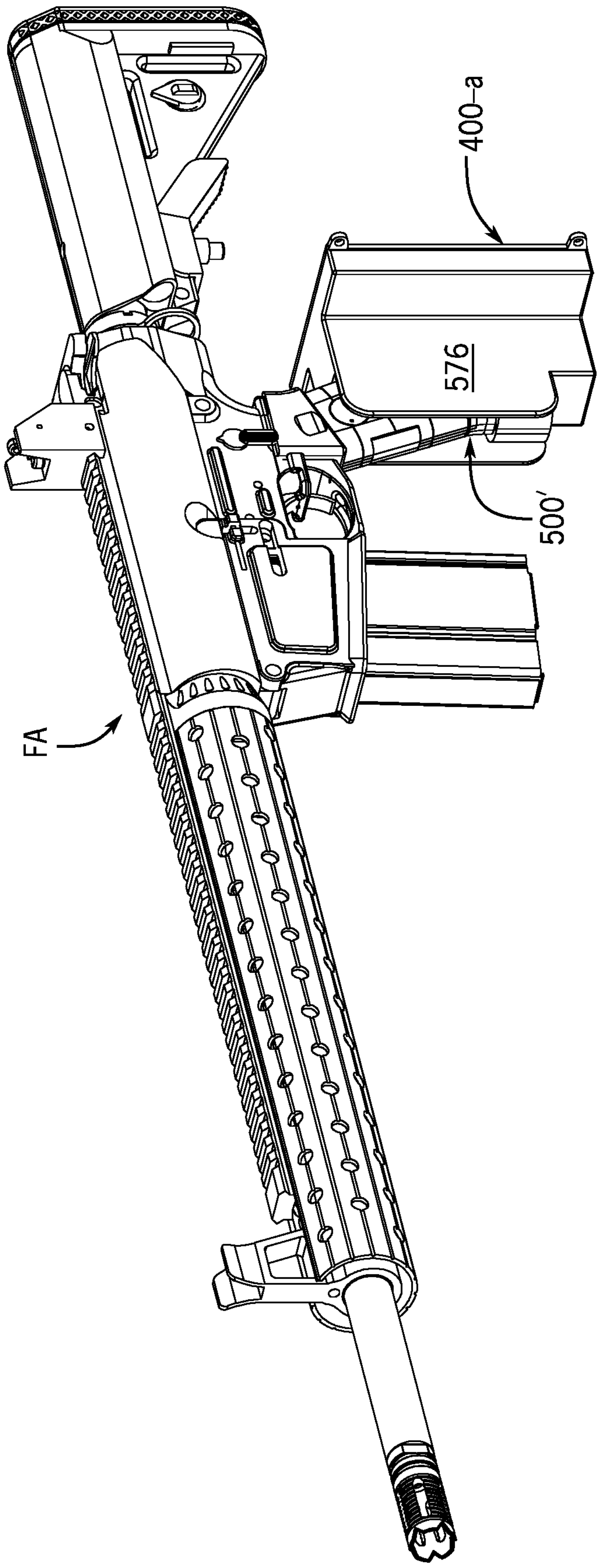
FIG. 5H illustrates an isometric view of the example authentication device in connection with the firearm and a docking station holding the authentication device, in accordance with various aspects of this disclosure.

FIG. 5H illustrates an isometric view of the example authentication device 500' in connection with the firearm FA and a docking station 400-*a* holding the authentication device 500'. The docking station 400-*a* can include a side wall as part of the cover 576 that conforms or is complementary to a shape of the authentication device 500' or grip of the firearm FA. FIG. 5H shows the authentication device 500' in a docked status such that secure communication of data can occur between the authentication device 500' and the docking station 400-*a*.

Figure 5I:
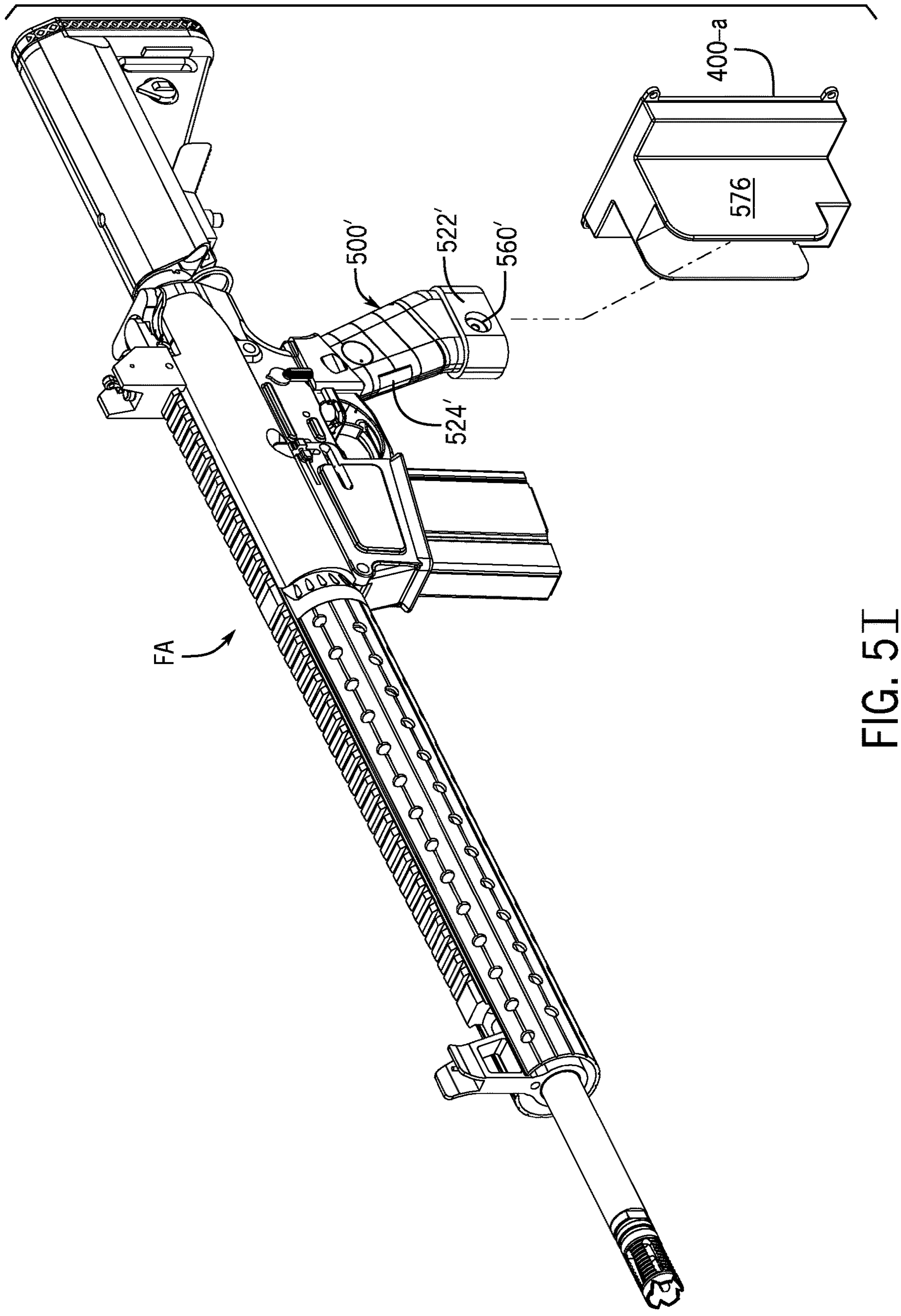
FIG. 5I illustrates an isometric view of the example authentication device in connection with the firearm and the docking station, in accordance with various aspects of this disclosure.

FIG. 5I illustrates an isometric view of the example authentication device 500' in connection with the firearm FA separated from the docking station 400-*a*. The cover portion 522' of the grip is shown as well as a biometric reader 524' which is shown on a front surface of the grip of the authentication device 500'. The cavity of the docking station 400-*a* that receives the authentication device 500' is shown as well.

Figure 5J:
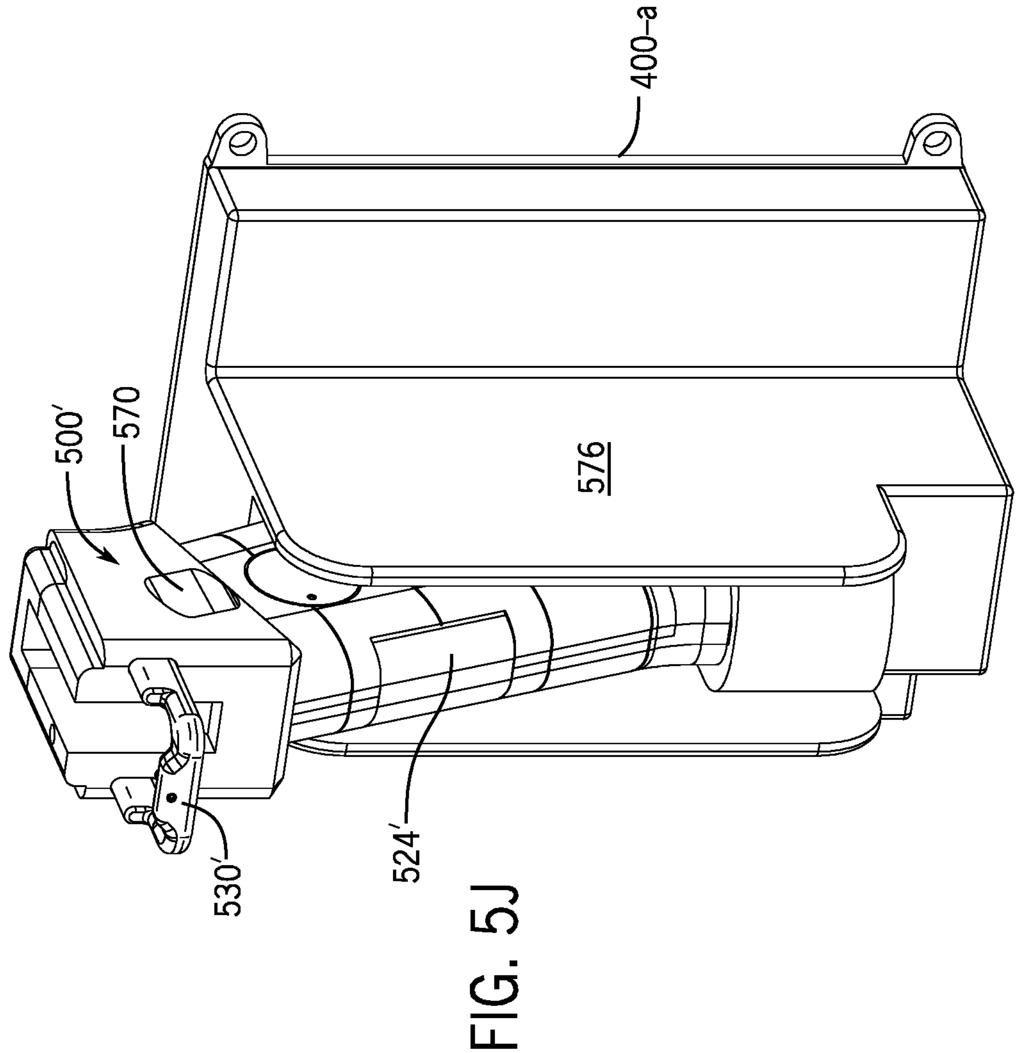
FIG. 5J illustrates an isometric view of the example authentication device and the docking station holding the authentication device, in accordance with various aspects of this disclosure.

FIG. 5J illustrates an isometric view of the example authentication device 500' and the docking station 400-*a* holding the authentication device 500' in a docked status. The cover 576 of the docking station 400-*a* is shown as well as the indentation 570 that can be configured such that a status light or other indicator can be viewed from behind the firearm FA but not from the front. The trigger interference member 530' is shown in this figure which feature can interact with (block or unblock) the movement of the trigger.

Figure 5K:
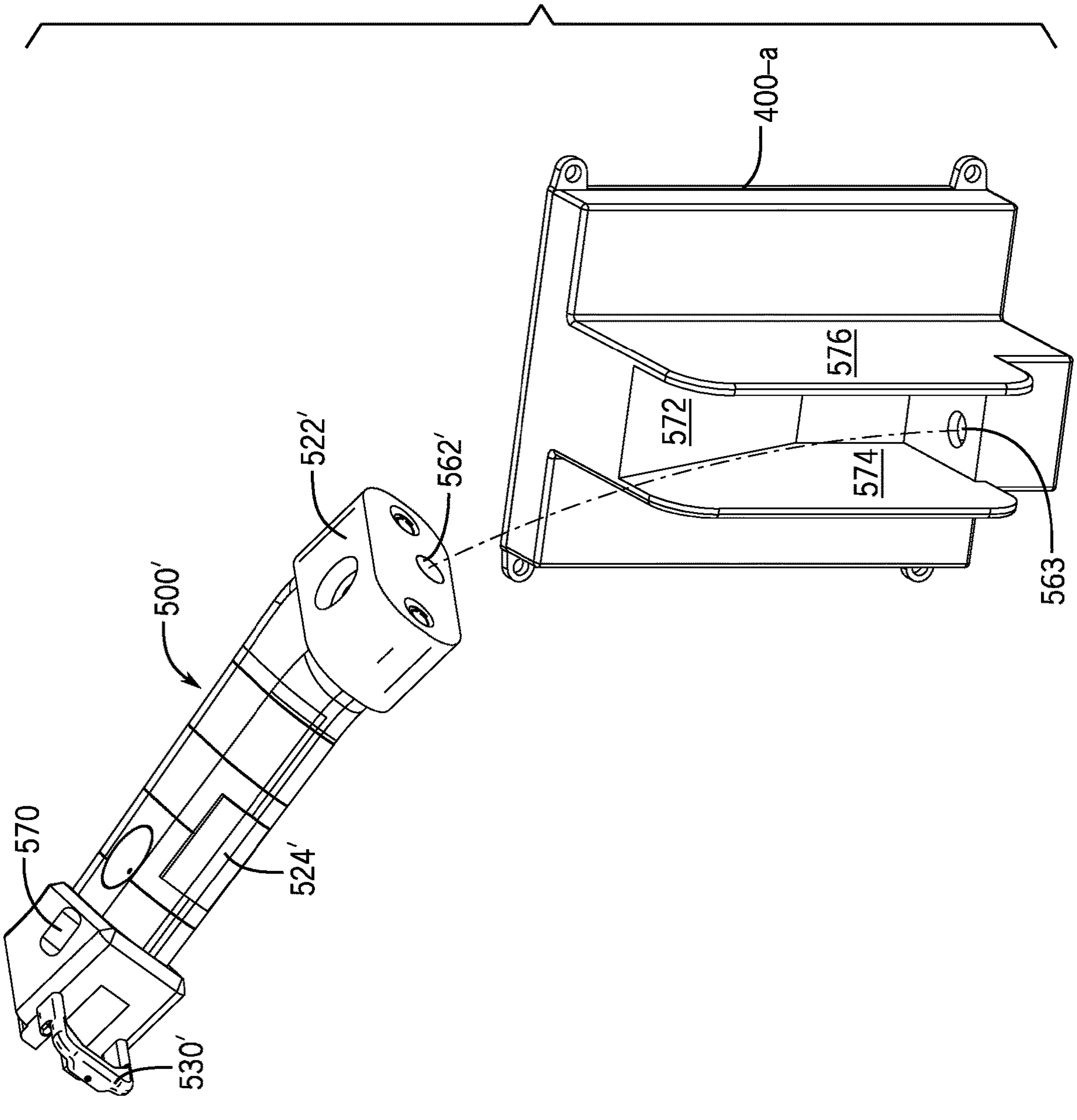
FIG. 5K illustrates an isometric view of the example authentication device as it docks with the docking station, in accordance with various aspects of this disclosure.

FIG. 5K illustrates an isometric view of the example authentication device 500' as it docks with the docking station 400-*a*. The interior cavity 572 of the docking station 400-*a* can be complementary in shape to hold the authentication device 500' and establish communication via a communication component 563 with the component 562' on the grip. AN interior wall 574 is shown that can provide side support for the authentication device 500'.

Figure 6:
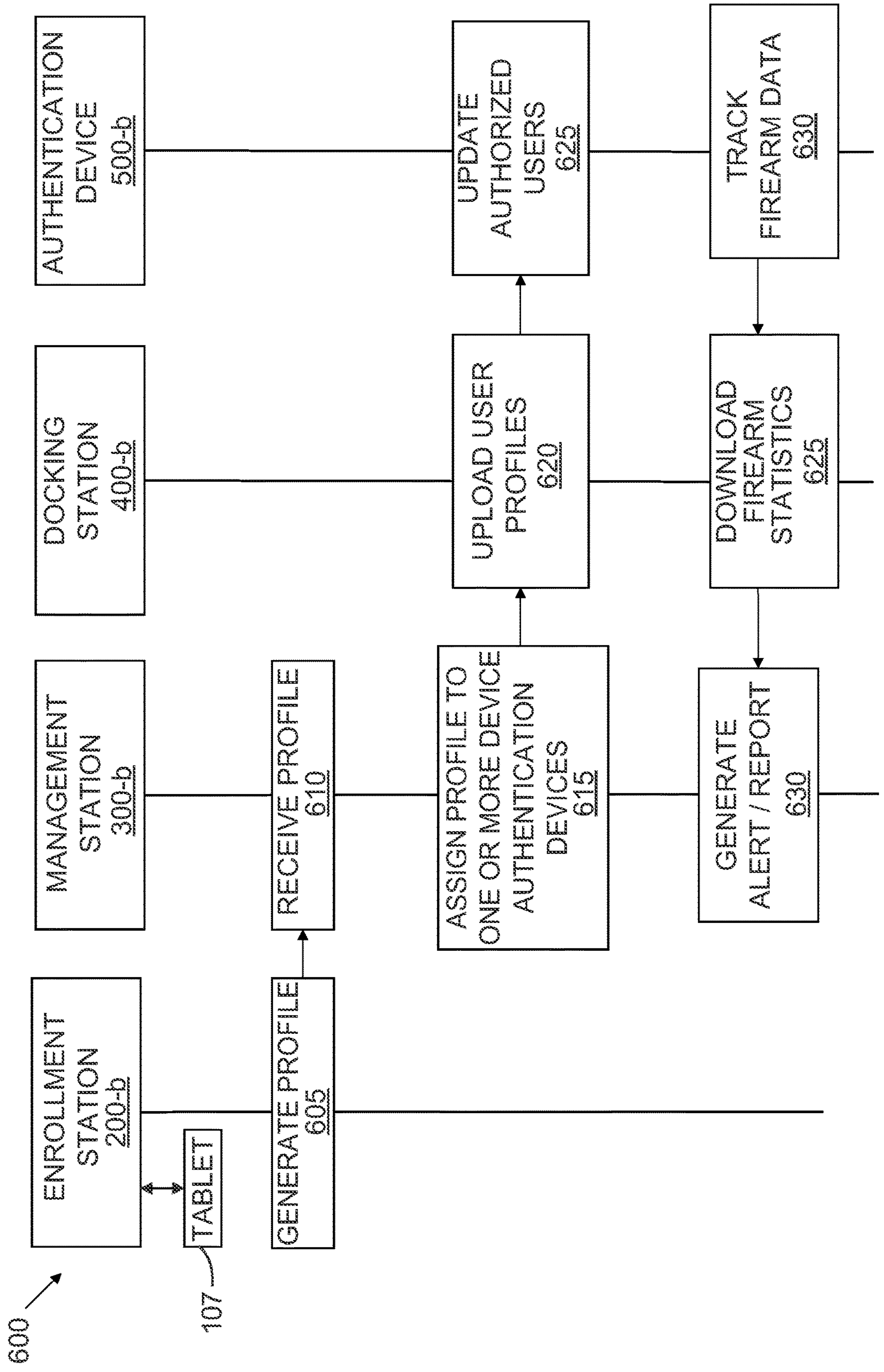
FIG. 6 is a swim diagram relating to a firearm authentication system, in accordance with various aspects of this disclosure, in accordance with various aspects of this disclosure.

FIG. 6 is a swim diagram 600 outlining the various ways the firearm authentication and tracking system can interact. The swim diagram 600 includes a user device 107, an enrollment station 200-*b*, a management station 300-*b*, a docking station 400-*b*, and an authentication device 500-*b*. Each of the devices/stations may be examples of previous stations/devices discussed herein.

At block 605, the enrollment station 200-*b* may generate a user profile. This may include gathering identifying data and personal information about the user from the user device 107 or otherwise. The management station 300-*b* may receive the profile at block 610. For example, the enrollment station 200-*b* may send the profile to the management station 300-*b* or the management station 300-*b* may request a user profile from the enrollment station 200-*b*.

The enrollment station 200-*b* can include a biometric sensor (fingerprint, facial recognition, etc.) to authenticate the user which can also occur in connection with communication with the user device 107. A proprietary printed circuit board can include or be programmed with the functionality described herein for the enrollment station 200-*b*. An RF antenna is included to scan biometric rings used by officers or other RFID component. It can also have a USB-OTG (USB On-The-Go) cable to connect to the user device 107 such as an Android tablet, iPad, or the like with specialized software and a power adapter. Any computer system can be configured to interact with the enrollment station 200-*b*. The user device 107 can establish a secure encrypted communication with the enrollment station 200-*b*. No data is actually stored on the enrollment station 200-*b* but, when prompted, it will scan for either an RFID or biometric scan. In one example, this is the only way to register with the system 115. The enrollment station 200-*b* communicates securely with the user device 107. The user device 107 creates the tunnel back to the cloud infrastructure or management station 300-*b*. The user device 107 is configured for each customer and can only be used by that person. The user device 107 communicates with the management station 300-*b* and stores the data about each person. The way that data gets transmitted to the firearm authentication device 500-*b* is through the docking station 400-*b* and through a secure communication with the management station 300-*b*. When the firearm is docked at the docking station 400-*b*, the data loaded onto the authentication device 500-*b* enables an authorized user to use the firearm.

At block 615, the management station 300-*b* may assign the user profile to one or more authentication devices 500-*b*. The management station 300-*b* may then communicate the user profile to a docking station 400-*b* at block 620. When the authentication device 500-*b* associated with a predetermined firearm is in communication with the docking station 400-*b*, the authentication device 500-*b* may update the authorized user profiles or download firearm statistics at block 625. Logs, usage data, geographic data, data regarding who has used the firearm, and so forth can be downloaded to the docking station 400-*b* when the authentication device 500-*b* is docked at the docking station 400-*b*. The docking station 400-*b* does not store any of this data but receives such data and repackages it for transmission to the management station 300-*b* (or other server 115) in a secure manner. The docking station 400-*b* can query the management station 300-*b* for any profile updates. For example, new users might be added to the system or some users removed from the system. The docking station can receive such updates to the profiles 620 and the updated data can be communicated to the authentication device 500-*b*.

As mentioned earlier, the authorized users may be organized into groups or tiers. The first tier may be immediate authorized users. These are users such as a law enforcement personnel and their partners or a military personnel and their squadron. The second tier may include all law enforcement personnel in a precinct or all authorized military personnel at a base or station. The third tier may include all law enforcement personnel in a district or perhaps a wider range of military personnel with authorization to operate the predetermined firearm.

At block 630, the authentication device 500-*b* may track firearm data. As mentioned previously, this may include any and all information about the firearm. This data can include logs, health statistics, usage data, location-based tracking, and so forth. In some embodiments, the personnel may select which parameters the authentication device tracks. In still further embodiments, the authentication device 500-*b* may track all known data and the management station 300-*b* may parse the data in a report for the personnel.

When the authentication device 500-*b* is in communication with the docking station 400-*b*, the docking station 400-*b* may download all firearm statistics and data. In some embodiments, the docking station 400-*b* may poll the authentication device 500-*b* at predetermined intervals to gather data. In additional or alternative embodiments, the authentication device 400-*b* may only download firearm statistics and/or authentication device data when the authentication device 500-*b* has been out of communication with the docking station 400-*b* for a predetermined time period. For example, if the authentication device 500-*b* has been disconnected from the docking station 400-*b* for more than 5 minutes, the docking station may download the firearm statistics. This predetermined time period or syncing of data may be set by personnel. The timing of synchronization can be related to a work shift, a triggering event such as a robbery or a holiday, a time of day, and so forth.

The docking station 400-*b* may transfer the firearm statistics to the management station 300-*b*. The management station 300-*b* may then generate either an alert or a report. The report, as mentioned, may be specific to firearms, squads, users, or the like. The reports may be generate based on system preferences. For example, an administrator of the system may set the reports and alerts they wish to receive.

In some embodiments, not shown in the system 600, the authentication device 500-*b* may directly communicate with the management station 300-*b*. This may enable the management station 300-*b* to generate one or more alerts in real time. For example, the management station 300-*b* may generate an alert when the firearm is discharged or when an unauthorized user attempts to discharge or access the authentication device 500-*b*. The immediate alerts can be determined by one or more administrators of the system.

Figure 7:
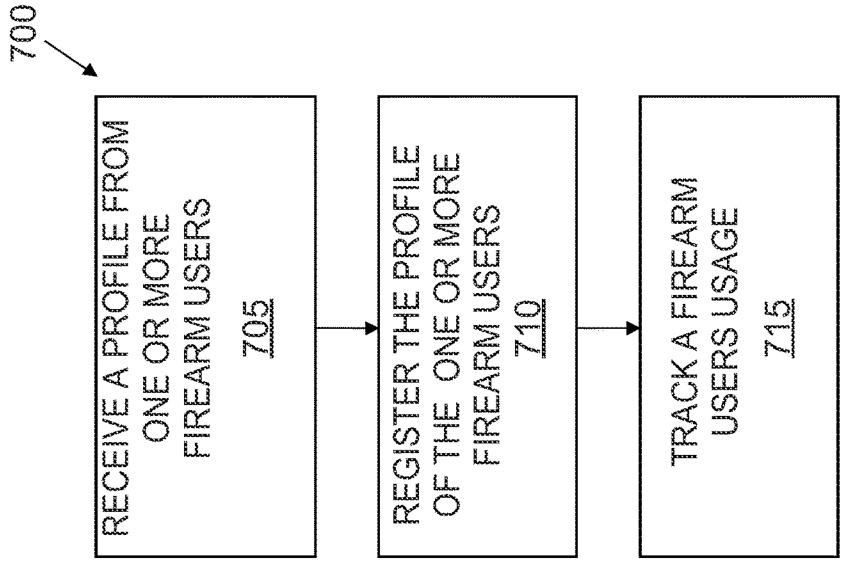
FIG. 7 is a flow chart illustrating an example of a method relating to a fire authentication system, in accordance with various aspects of this disclosure.

FIG. 7 illustrates an example method 700 of managing one or more firearms having an authentication device 500. The method 700 may be implemented on one or more devices or stations discussed herein. At step 705, the method 700 may include receiving a profile of one or more firearm users. At block 710, the method 700 may include registering the profile of the one or more firearm users to access one or more authentication devices coupled to one or more firearms. At step 715, the method 700 may include tracking a firearm user's usage of the one or more firearms coupled to the authentication devices via the profile of the firearm user.

Figure 8:
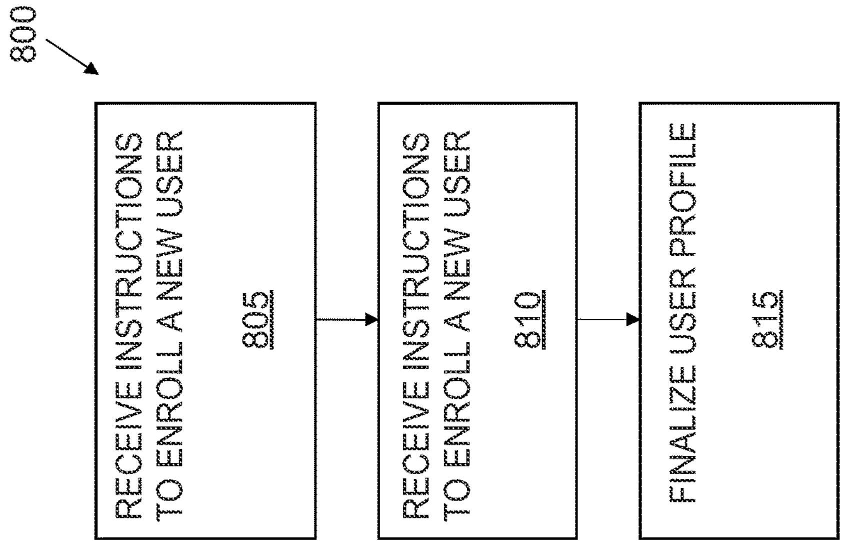
FIG. 8 is a flow chart illustrating an example of a method relating to a fire authentication system, in accordance with various aspects of this disclosure.

FIG. 8 illustrates an example method 800 of enrolling a user of a firearm safety system. The method 800 may be implemented on one or more devices or stations discussed herein. At step 805, the method 800 may include receiving instructions to enroll a new user of the firearm safety system. At block 810, the method 800 may include receiving one or more biometric data points from the new user. At block 815, the method 800 may include finalizing a user profile with the one or more biometric data points. The one or more biometric data points may enable the new user to access at least one authentication device coupled to a firearm.

Figure 9:
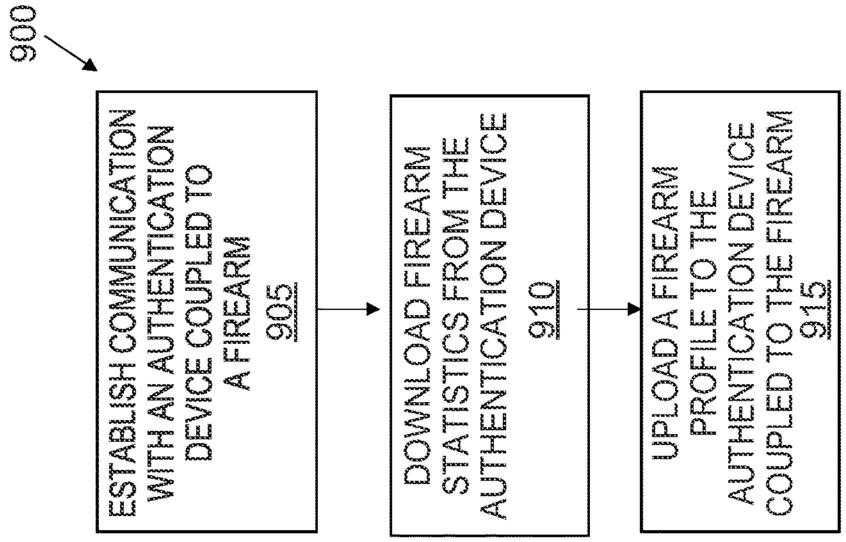
FIG. 9 is a flow chart illustrating an example of a method relating to a fire authentication system, in accordance with various aspects of this disclosure.

FIG. 9 illustrates an example method 900 of communicating with a firearm authentication device in accordance with various embodiments described herein. At block 905, the method 900 may include establishing communication with an authentication device coupled to a firearm. At block 910, the method may include downloading firearm statistics from the authentication device. At block 915, the method 900 may include uploading a firearm profile to the authentication device coupled to the firearm.

The methods described herein, and any functionality or operations that is disclosed, can be captured or described in an embodiment in which the particular steps are practiced by one or more of the stations or devices disclosed herein. For example, a method as practiced by an authentication device 500 in terms of receiving data, transmitting data, obtaining data, and so forth, can represent an embodiment of this disclosure. The steps practiced by a management station 300 or an enrollment station 200, or the combination of a docket station 400 and an authentication device 500 also can be defined in terms of the steps performed by the one or more components. One embodiment can be to a firearm having an associated authentication device 500 as well.

It is noted that in one aspect, the steps disclosed herein can be practiced by a "system." The system can include the server and one or more clients together, or might just be functionality performed by the server. The system could also be a client or a group of clients, such as clients in a particular geographic area or clients groups in some manner that are performing the client-based functions disclosed herein. Claims can be included which outline the steps that occur from the standpoint of any device disclosed herein. For example, the steps of transmission, calculation, and receiving of data can be claimed from the standpoint of a server device, a client device, or group of client devices depending on which embodiment is being covered. All such communication from the standpoint of an individual component or device can be included as within the scope of a particular embodiment focusing on that device. In once aspect, a system could be defined as a firearm and an associated authentication device 500 configured on the firearm.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Any individual claim below can be dependent from any one or more of the previous claims. Any concept disclosed herein can be used in connection with any other concept.

Claim language reciting "at least one of" a set indicates that one member of the set or multiple members of the set satisfy the claim. For example, claim language reciting "at least one of A and B" means A, B, or A and B.

I claim:

1. A method comprising:

receiving, at a docking station separate from a firearm and having a firearm-receiving cavity configured to receive a portion of a firearm grip associated with an authentication device for docking, a status of the authentication device associated with the firearm;

receiving a registration, at an enrollment module, of one or more users associated with the firearm, wherein the enrollment module is separate from the docking station; and managing, via a management station, access to the firearm through the authentication device, wherein the management station is separate from the firearm and is in communication with at least one of the docking station and the enrollment module.

2. The method of claim 1, further comprising:

globally managing a plurality of firearms in which each respective firearm is associated with a respective authentication device and wherein each respective firearm provides a status of its respective authentication device to a respective docking station and wherein one or more respective users associated with each respective firearm is registered with the enrollment module.

3. The method of claim 1, further comprising:

communicating, from the docking station, one or more of a battery status of the authentication device, an operable status of the authentication device, a docking status, or a health status of the firearm to a network-based server.

4. The method of claim 1, further comprising:

docking, via the docking station, a firearm grip associated with the authentication device.

5. The method of claim 1, further comprising:

registering, via the management station, a profile of a firearm user to access the authentication device when coupled to the firearm; and tracking usage by a firearm user of the firearm coupled to the authentication device via the profile of the firearm user.

6. The method of claim 5, further comprising:

determining, via the management station, credentials of each profile of one or more firearm users and allocate the credentials to predetermined firearms.

7. The method of claim 1, further comprising:

grouping, via the management station, one or more user profiles into one or more groups.

8. The method of claim 7, further comprising:

assigning, via the management station, each of the one or more user profiles a ranking level within the one or more groups.

9. The method of claim 7, further comprising:

assigning, via the management station, one or more firearms to the one or more groups.

10. The method of claim 1, further comprising:

tracking, via the management station, at least one of a location, discharge, battery, and usage statistics of the firearm.

11. The method of claim 1, further comprising:

determining, via the management station, a geographical location of the firearm.

12. The method of claim 1, further comprising:

defining, via the management station, a predetermined usage boundary for the firearm and disabling, automatically, the firearm when the firearm violates the predetermined usage boundary.

13. The method of claim 12, wherein the predetermined usage boundary comprises one or more of a geographical boundary, an unauthorized user of the firearm, a predetermined number of discharges from the firearm, and a predetermined type of ammunition.

14. The method of claim 1, further comprising:

receiving, via the management station, usage data about the firearm;

analyzing the usage data to yield analyzed usage data; and generating a report detailing the analyzed usage data.

15. The method of claim 1, further comprising:

receiving, via the management station, a discharge notification when the firearm discharges and to generate a discharge alert when the discharge notification is received.

16. The method of claim 1, further comprising:

receiving, via the management station, a docking notification when the firearm is docked and generating a docking alert when the docking notification is received.

17. The method of claim 1, further comprising:

receiving, via the management station, a firearm profile of the firearm and to register the authentication device to the firearm profile.

18. A system comprising:

a docking station having a firearm-receiving cavity configured to receive a portion of a firearm grip associated with an authentication device for docking configured to receive a status of an authentication device associated with a firearm, wherein the docking station is separate from the firearm;

an enrollment module configured to receive a registration of one or more users associated with the firearm, wherein the enrollment module is separate from the docking station; and a management station configured to manage access to the firearm through the authentication device, wherein the management station is separate from the firearm and is in communication with at least one of the docking station and the enrollment module.

* * * * *